United States Patent [19]
Wang

[11] Patent Number: 5,854,882
[45] Date of Patent: Dec. 29, 1998

[54] HALFTONE CORRECTION SYSTEMS

[75] Inventor: Shenge Wang, Fairport, N.Y.

[73] Assignee: The University of Rochester, Rochester, N.Y.

[21] Appl. No.: 554,876

[22] Filed: Nov. 7, 1995

Related U.S. Application Data

[63] Continuation-in-part of Ser. No. 225,121, Apr. 8, 1994, Pat. No. 5,469,267.

[51] Int. Cl.$^6$ .............................. G06F 15/00; H04N 1/40; G03F 3/08
[52] U.S. Cl. ........................ 395/109; 395/108; 358/456; 358/458; 358/518; 358/534; 358/536
[58] Field of Search .................................. 395/109, 108; 358/455, 456, 458, 298, 465, 459, 300, 500, 501, 518, 520, 521, 504, 454, 516, 517, 519, 530, 534, 536

[56] References Cited

U.S. PATENT DOCUMENTS

| | | | |
|---|---|---|---|
| 3,742,129 | 6/1973 | Roberts et al. | 358/298 |
| 4,196,454 | 4/1980 | Warren | 358/456 |
| 5,313,291 | 5/1994 | Appel et al. | 358/501 |
| 5,331,429 | 7/1994 | Levien | 358/456 |
| 5,359,430 | 10/1994 | Zhang | 358/455 |
| 5,469,267 | 11/1995 | Wang | 358/298 |
| 5,546,165 | 8/1996 | Rushing et al. | 358/456 |
| 5,565,995 | 10/1996 | Yamada et al. | 358/298 |
| 5,572,600 | 11/1996 | Tajima et al. | 358/454 |
| 5,684,932 | 11/1997 | Shu | 395/109 |

OTHER PUBLICATIONS

Measurement of Printer Parameters for Model–based halftoning, T.N. Pappas, C.K. Dong and D.L. Neuhoff, Journal of electronic Imaging, vol. 2 (3), pp. 193–204, Jul. 1993.

Measurement–based Evaluation of a Printer Dot Model for Halftone Algorithm Tone Correction, C.J. Rosenberg, Journal of Electronic Electronic Imaging, vol. 2 (3), pp. 205–212, Jul. 1993.

*Primary Examiner*—Edward L. Coles
*Assistant Examiner*—Mark Wallerson
*Attorney, Agent, or Firm*—K. Lukacher; M. Lukacher

[57] ABSTRACT

Halftone correction systems are provided for producing dot overlap corrected halftone images at a digital printer. In the first embodiment, a system is provided for halftone correction on a black-and-white digital printer. The system first calibrates the black-and-white digital printer with seven test patterns to provide halftone correction information. Multi-level digital image signals representing a continuous-tone image are then received and stored. The system next halftones these multi-level digital image signals to provide an overlap corrected halftone image responsive to the halftone correction information at the digital printer. Halftoning is performed using an overlap corrected ordered dithering screen, which was generated based upon the correction of the partial overlap of adjacent dots in an uncorrected ordered dithering screen. In the second embodiment, a system is provided for producing dot overlap corrected color halftone images on a digital color printer. The system first calibrates the digital color printer with a set of color test patterns to provide halftone correction information. Next, multi-level digital color image signals representing a continuous-tone color image are received and stored. The system then halftones the multi-level digital color image signals to provide an overlap corrected color halftone image responsive to the halftone correction information at the digital color printer. The system may halftone the continuous-tone color image by either color error diffusion or ordered dithering techniques. In the third embodiment, a system is provided for dot overlap correction of halftone images at a digital printer which is coupled to multiple computers in a network.

56 Claims, 15 Drawing Sheets

HALFTONE CORRECTION SYSTEMS

CROSS-REFERENCE TO RELATED APPLICATIONS

This application is a continuation-in-part of application Ser. No. 08/225,121, filed Apr. 8, 1994, for Halftone Correction System, issuing Nov. 21, 1995 as U.S. Pat. No. 5,469,267 which is herein incorporated by reference.

FIELD OF THE INVENTION

The present invention generally relates to halftone correction systems (apparatus and methods) for generating dot overlap corrected halftone images, and more particularly, to improved systems for halftone correction which addresses the effects of printed dot overlap in halftoning either color or gray-scale digital continuous-tone images.

BACKGROUND OF THE INVENTION

Digital halftoning, also referred to as spatial dithering, is a process in which digital input signals to a digital printer are modified prior to printing a hard copy, such that a digitally printed version of a photographic image creates the illusion of a continuous-tone copy of the photographic original. In black-and-white printing, most hard-copy devices operate in a binary mode, i.e., a printed dot is either present or absent on a two-dimensional printer medium at a specified location. Whereas in color printing, such as by digital color laser printers, a color dot is printed based upon the binary mode of each of several colors being present or absent on the printer medium. Thus, due to the binary nature of such printers, a true continuous-tone reproduction of a photographic image is not possible with most digital printers.

In order to create the appearance of continuous-tone gray-scale images at a black-and-white printer, the digital input signals to the printer are modified (halftoned) prior to printing so as to direct the printer to spatially distribute the printed dots thereby increasing or decreasing the distribution of printed dots about a designated area on the print. Generally two techniques are used in black-and-white halftoning, namely error diffusion and ordered dithering.

In color halftoning, prior to printing at a digital color image output device, such as a digital color printer or digital color press, digitized continuous-tone color images are also modified (halftoned) into binary color input signals. The binary color input signals to a color printer describe the binary modes of the colors for each printed dot. Typically in a digital color printer, these colors are cyan, magenta, and yellow (CMY) or CMY plus black (CMYK). For example, in a CMY digital color printer, a color dot is printed based upon the binary modes of cyan, magenta, and yellow. Combination of cyan, magenta, and yellow may produce other colors, including green, blue, red, and black, or white representing the absence of color and the background. Thus, there are $2^3$, or 8, possible combinations of CMY for each printed color dot. Color halftoning of digitized continuous-tone color images is usually performed by either frequency modulated (FM) or amplitude modulated (AM) halftoning techniques. The AM method groups small printed color dots into larger "halftone dots" in varied sizes, while the FM method distributes the small printed color dots spatially.

Different types of printers, and even different printers among the same printer type, produce differently sized and differently shaped printed dots. Even a specific digital printer frequently generates printed dots having a size variation as a function of dot position. Hence, it has become apparent that a halftone correction system must be tailored to the characteristics of each particular digital printer. Frequently, printed dots adjacent to each other tend to overlap. This overlap of printed dots is present in both black-and-white and color digital printers. However, the overlap of printed color dots is more complex than dots printed by a black-and-white printer because color dots can be combinations of several colors, and the different colors composing color dots can be of different sizes and shapes. Moreover, the overlap of adjacent color dots affects not only perceived intensity, but also the color hue appearance of the color halftone images on the printer media. This results in both color and intensity distortion, whereas black-and-white printing is only subject to the intensity distortion. Accordingly, successful halftone correction systems must take account of dot overlap.

In the case of black-and-white digital printers, a recent publication, titled *Measurement of Printer Parameters for Model-based Halftoning*, by T. N. Pappas, C. K. Dong, and D. L. Neuhoff, *Journal of Electronic Imaging*, Vol. 2 (3), pages 193–204, July 1993, describes various approaches for halftone correction based on a dot overlap model of dots printed by a particular digital printer. To accomplish halftone correction, Pappas, et al. describe printing of a variety of test patterns by the same printer. The test patterns are intended to be used for characterization of printed dot overlap and are measured by a reflection densitometer (see particularly pages 198 and 199 of the Pappas, et al. publication) so as to obtain measured values of average reflectance of these various test patterns. The calculated printer model parameters, based on the measurement of test patterns, are then used to provide halftone correction or gray-scale rendition of digital image data representative of an original image to be printed. Halftone correction can be accomplished for example by a known so-called modified error diffusion algorithm or by a known least-squares model algorithm. In the overlap correction approach described by Pappas et al., each printed dot is positioned within a superimposed, or overlaid, virtual Cartesian grid such that the center of each dot is coincident with the center of the spacing between adjacent grid lines. Accordingly, Pappas, et al. require at least 32 total test patterns for the simplest shape of the scanning window, 512 possible test patterns for a 3×3 scanning virtual window, and a total of 33,554,432 possible test patterns for a 5×5 scanning virtual window. Even considering that dot overlapping can be symmetric about both the x and y directions of the grid, thereby reducing the number of possible patterns, the computational complexity and associated complicated optimization calculations become formidable in the overlap correction approach described by Pappas, et al.

Another publication, titled *Measurement-based Evaluation of a Printer Dot Model for Halftone Algorithm Tone Correction*, by C. J. Rosenberg, *Journal of Electronic Imaging*, Vol. 2 (3), pages 205–212, July 1993, describes a tone scale correction approach for digital printers which produce potentially overlapping circular dots, each dot centered at the center of a grid opening of a superimposed grid. This dot overlapping model assumes that all printed dots have a perfectly circular shape. Here, the reflectance of a number of constant gray-scale test patches, or test patterns, is measured, and the reflectance values are inverted to obtain a tone response correction curve. This measurement-based calibration of a printer (see FIG. 2 of the Rosenberg paper) is repeated for all digital gray levels anticipated to be printed by the printer. The tone response correction curves are then used in conjunction with one of several known halftoning algorithms to generate a calculated dot diameter which would provide a best fit to the measured data, whereby one best fit approach is based on minimizing the rms error between the measured tone response curve and that derived from the model, and a second approach is based on generating an improved match in terms of the visual perception by a human observer.

The above halftone correction approaches focus on halftoning continuous-tone gray-scale images for black-and-white digital printers, where printed halftone images are composed of black dots. These approaches do not address the printed dot overlap problem in color printing because they cannot practically be extended to dot overlap correction of color halftone images, because of the excessive number of computations required.

Conventional color halftoning methods used in digital color printing do not consider the overlapping effect of adjacent color dots on the printer media. This results in color and intensity distortion of the printed halftone images. The conventional color correction methods generally apply color tone correction curves to the color signals representing the digitized continuous-tone color image prior to color halftoning, and thus do not automatically adjust for the overlap of adjacent color dots on the printer media.

Color correction methods in the photo-finishing industry also use tone correction techniques and have an efficiency problem. A digital color press is often used to print color halftone images onto media in the photo-finishing industry. To control the appearance of printed halftone images, several thousands of color test patches, or patterns, must be printed by the press and evaluated by trained press operators. Based on their evaluation, the operators adjust the press to achieve the desired color appearance, thereby to correct for distortions due to color dot overlapping. The problem of this method is that it is time-consuming, depends on the subjectivity of trained operators, and requires printing an excessive number of color test patches.

Thus, digital halftone correction, particularly dot overlapping correction, relies upon the determination of the actual physical output of a printer for given binary input signals. Accordingly, it would be desirable to devise halftone correction systems which minimize the required number of test patterns, thereby minimizing the complexity of determination of the extent of printed dot overlap and minimizing the attendant computation to achieve effective dot-overlapping correction. Furthermore, in the area of color halftoning it would be desirable to provide halftone correction systems that are efficient, fast and objective, and applicable to both digital color printers and digital color presses.

SUMMARY OF THE INVENTION

It is an object of the present invention, in accordance with one embodiment of the invention, to provide an improved halftone correction system to correct printed dot overlap in black-and-white printing when the halftoning is performed by ordered dithering techniques.

It is also an object of the present invention, in accordance with another embodiment of the invention, to provide an improved halftone correction system for producing dot overlap corrected color halftone images by either FM or AM halftoning techniques.

It is an object of the present invention, in accordance with still another embodiment, to provide an improved halftone correction system such that overlap corrected halftone images are provided at a digital printer in response to a received uncorrected halftone image, which may be from one of a plurality of computers.

Briefly described, the invention in accordance with the first embodiment thereof provides a system for producing dot overlap corrected halftone images on a black-and-white digital printer. The system includes a digital scanner and a black-and-white digital printer which are both coupled to a computer. The digital printer is first calibrated with a set of test patterns to provide the halftone correction information. After calibration, multi-level digital image signals, such as produced by the digital scanner, representing a continuous-tone image are received and stored. The multi-level digital image signals of the continuous-tone (gray-scale) image are then halftoned, responsive to the halftone correction information, to provide a dot overlap corrected halftone image at the digital printer. Further in accordance with this embodiment, the system operates by an ordered dithering halftoning technique using an overlap corrected ordered dithering screen, which is based upon the correction of the partial overlap of adjacent dots in an uncorrected ordered dithering screen.

In accordance with the second embodiment of the invention, a halftone correction system is provided which produces dot overlap corrected color halftone images on a digital color image output device, such as a digital color printer or digital color press. The system includes a color scanner and a digital color image output device which are both coupled to a computer. The digital color image output device is first calibrated with a set of color test patterns to provide halftone correction information. Next, multi-level digital color image signals representing a continuous-tone color image are received and stored. The multi-level digital color image signals of the continuous-tone color image are then halftoned, responsive to the halftone correction information, to provide an overlap corrected color halftone image at the digital color image output device. The system may halftone the continuous-tone color image by either color error diffusion or ordered dithering techniques responsive to the halftone correction information.

In accordance with the third embodiment of the invention, a system is provided for dot overlap correction of halftone images at a digital printer. The system includes one or more computers which are coupled (networked) to the digital printer through a printer server. The digital printer operates responsively to two-dimensional binary image signals. The printer is calibrated with a set of test patterns to provide halftone correction information. In this system, uncorrected two-dimensional binary image signals, representing an uncorrected halftone image, are received and stored by the printer. Multi-level digital image signals are then generated at the printer responsive to the uncorrected binary image signals of the uncorrected halftone image. Thereafter, these multi-level digital image signals are stored. A corrected halftone image output at the printer is produced by halftoning the multi-level digital image signals responsive to the halftone correction information, preferably in a manner described in the cited co-pending application for black-and-white printing or in the second embodiment for color printing, wherein operations are performed at the digital printer and the scanner is removed.

In accordance with the above described embodiments of the invention, calibration of the digital printer is performed by sending a sequence of test pattern digital signals corresponding to test patterns to the input of the digital printer so that a printed output of the test patterns is produced as patches of arranged printed dots. The test patterns are sufficient in number to characterize the image output device. For the printed output, the average optical value reflectance or transmittance of each printed output is measured, and then stored as a normalized average levels, thereby obtaining the halftone correction information.

BRIEF DESCRIPTION OF THE DRAWINGS

The present invention will be better understood and appreciated from the following detailed description in conjunction with the accompanying drawings, in which.

DETAILED DESCRIPTION OF THE EMBODIMENTS

Figure 1:
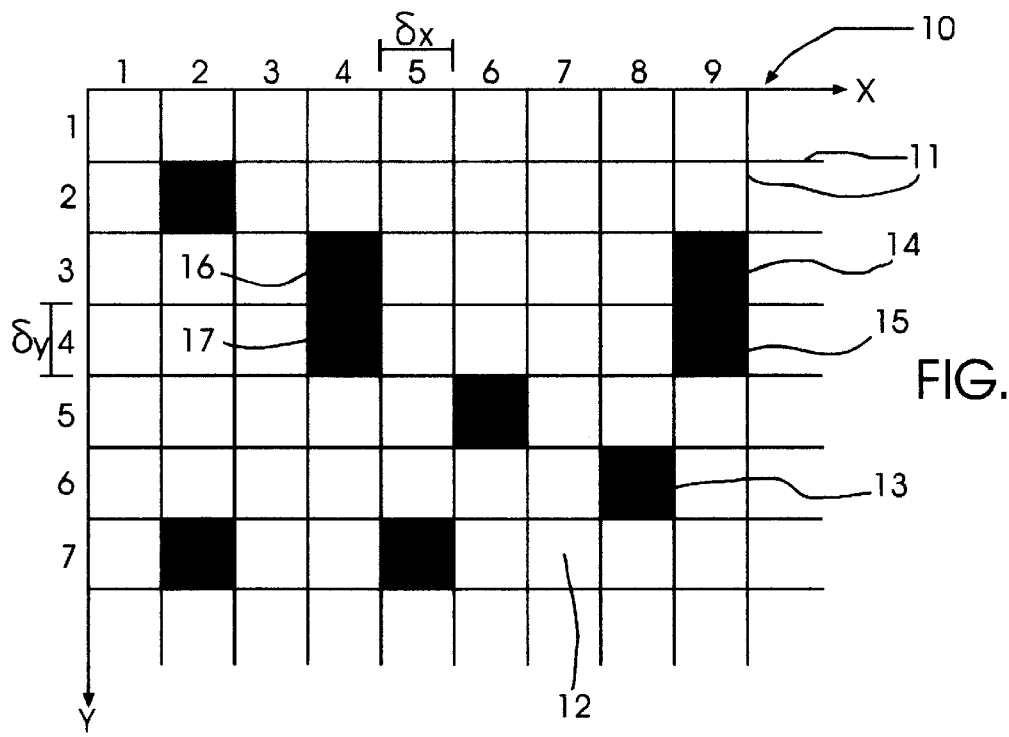
FIG. 1 is an enlarged rendition of an idealized printer output, showing square-shaped, non-overlapping printed dots positioned within an orthogonal screen, or grid, such that each dot is located coincident with a screen opening.

Referring now to FIG. 1, there is shown an enlarged rendition 10 of idealized, square-shaped digital printer output dots 13–17, placed or positioned in a superimposed or overlaid X-Y orthogonal screen, or grid system, where each grid opening 12 has dimensions δx, δy. Grid lines 11 delineate screen or grid openings 12. Each idealized square dot is positioned centrally within each screen opening 12. Adjacent printed dots 14, 15 and 16, 17 are non-overlapping.

Figure 2:
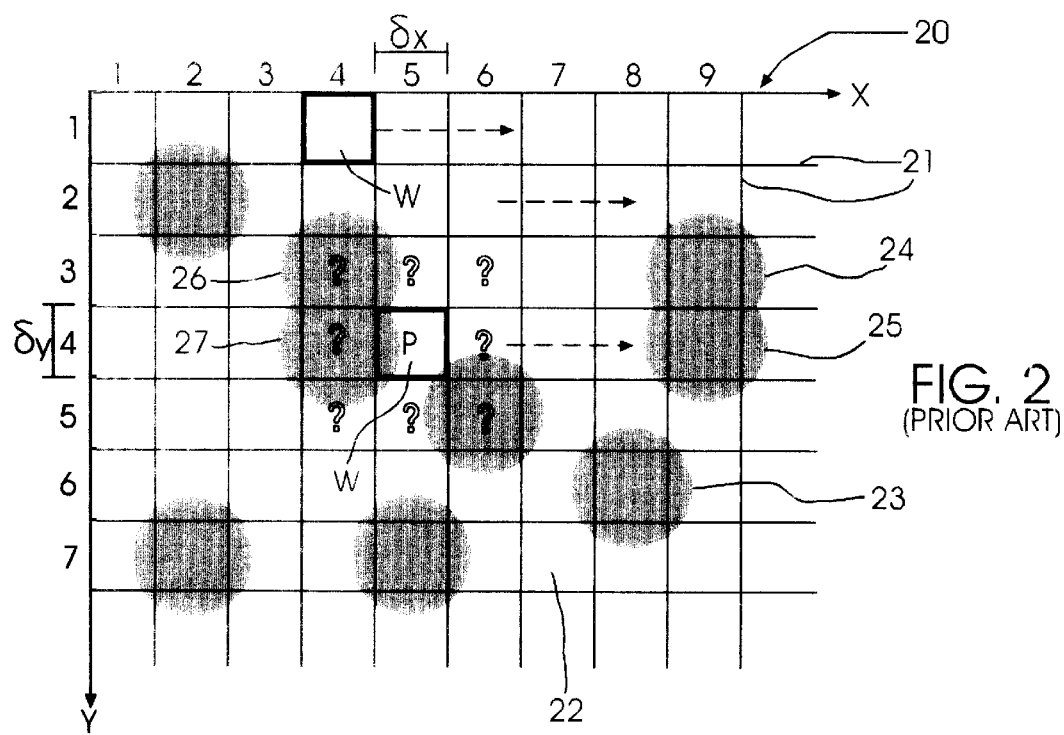
FIG. 2 is an enlarged prior art rendition showing circular printed dots positioned in an orthogonal coordinate system of a screen, or grid, where the dots are centered at the center of each opening in the screen, and where the diameter of the dots is larger than the screen openings. A window W is indicated as a scanning window, having a size identical to the size of the screen openings.

Referring now to FIG. 2, there is depicted an enlarged prior art version 20 of circularly shaped dots 23–27, located within an overlaid orthogonal X-Y coordinate system. Each printed dot is centered at the center of a screen opening 22 having dimensions δx, δy. A window W congruent with a screen opening 22, is indicated by arrows as a scanning window. The diameter of each circular dot is larger than a screen opening. At the window position indicated at pixel 5 along the X axis and pixel 4 along the Y axis, the window is surrounded by eight question marks, intended to indicate the uncertainty of the degree of dot overlap contributions P to the window from the eight dots immediately surrounding the window in that position. It is evident that dot 26 and dot 27 may contribute to the filling of the window to a certain extent, as may the dot in pixel position 6, 5. Thus, it appears that dot overlap contributions P to a window W can not be easily ascertained from the status of eight surrounding dots in addition to the window position itself when the dots are centered at the center of the screen openings.

Figure 3:
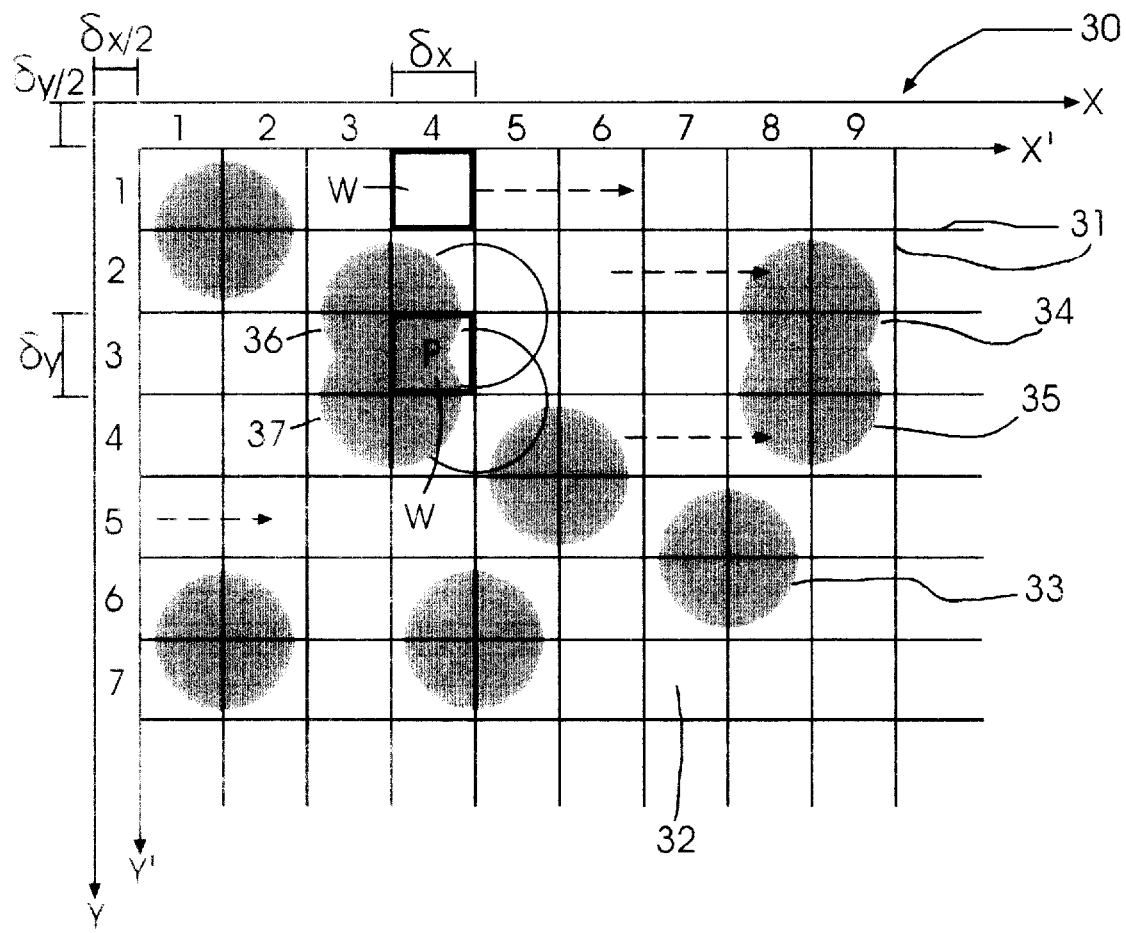
FIG. 3 is an enlarged rendition of printed circular dots located within an orthogonal coordinate system in accordance with the present invention, where the coordinate system is shifted relative to the coordinate systems in FIGS. 1 and 2 by an amount equal to ½ the dimension of each screen opening in both orthogonal directions, so that the printed circular dots are now centered at the intersections of orthogonal grid lines. The circular dots have a diameter larger than the dimensions of the openings in the screen. A scanning window W is shown in a position centered about the position of four adjacent dots. Two of the dots actually overlap each other and two dot positions indicate the absence of printed dots.

Referring now to FIG. 3, there is shown an enlarged rendition of a printer output 30, having produced circular shaped dots on an overlaid rectangular coordinate screen system designated by coordinates X' and Y', offset from the original X-Y coordinate system of FIGS. 1 and 2 by half of the grid dimensions δx and δy. Again, the diameter of each dot is larger than the screen opening dimensions δx and δy. The effect of the offset of the screen coordinate system is to position circular dots 33–37 so that the center of each dot is now centered at the intersection of lines 31 defining screen openings 32. A virtual scanning window W is again indicated by arrows. At the window position 4 along the X' axis and position 3 along the Y' axis there is shown a substantial contribution P of circular dots 36 and 37 in terms of their overlap within the window at that location. Open circles, centered at the upper and lower right-hand corners of the window W, are included to suggest that the location of printed dots on the orthogonal coordinate system X', Y' provides for dot overlap contributions P to the window from a 2×2 matrix of dots immediately surrounding the window at the window position shown here. The coordinate system of X' and Y' provides a virtual screen on the printed dots.

Referring again to FIG. 2, at a black-and-white digital printer the printed dots are controlled by a binary digital signal input B(i,j), where B(i,j)=0 indicates a dot present (black dot) at a position indexed by i,j, and B(i,j)=1 indicates an absent dot (white dot) at the same position i,j. The output G(i,j) of a chosen digital printer is a measure of an average optical characteristic feature (for example, reflectance, or transmittance) of a window defined within a grid or screen coordinate system X-Y, such that $i \cdot \delta x \leq x \leq (i+1) \cdot \delta x$ and $j \cdot \delta y \leq y \leq (j+1) \cdot \delta y$.

The centering of dots on the shifted (virtual) screen is used in accordance with the invention, as will be described more fully below.

Considering, for example, the 3×3 matrix case suggested in the previously mentioned paper by Pappas et al., where dot overlapping may exist, the output of a given pixel G(i,j) depends on the dot overlap contribution P to a window W by a dot in the window and by the 8 immediate neighbors shown by the question marks in FIG. 2. Therefore, the previously described 3×3 overlapping matrix requires a maximum of $2^9$ or 512 independent parameters to calculate the possible values of the output function G(i,j) with all possibilities for dot overlap. While this number of 512 independent parameters can be reduced under the assumption of symmetry of overlap in both X and Y directions, and may be further reduced under certain circumstances, the number of independent parameters for a 3×3 matrix having eight potential dots surrounding the window W cannot be easily reduced below 50. To arrive at a solution for 50 independent parameters requires substantial computational effort and expense.

In contrast to the 3×3 matrix approach disclosed by Pappas, et al., using centering in accordance with the present invention, requires only a matrix of 2×2 adjacent dots, in view of the shifted screen or grid pattern relative to the position of the printed dots. For example, an output pixel G'(i,j), indicated by the window position 4 along the X' axis and 3 along the Y' axis in FIG. 3 is located at the center of four dot positions controlled by binary image signals to the printer B(i−1,j−1), B(i,j−1), B(i−1,j) and B(i,j).

Figure 4:
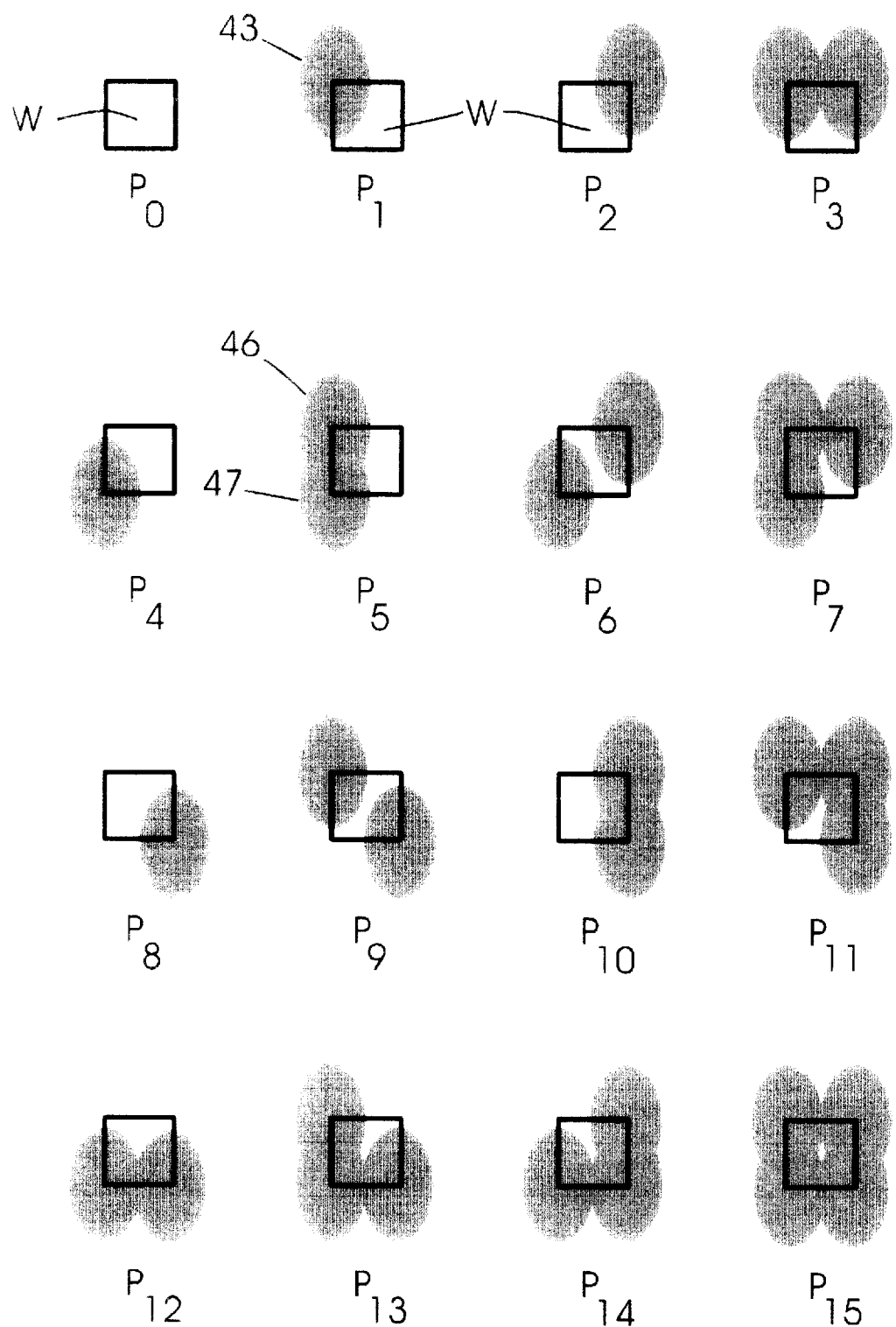
FIG. 4 indicates 16 possible combinations of potential overlap of up to four adjacent elliptically-shaped printed dots within a window W for the matrix or grouping of 2×2 (i.e. 2 by 2) overlapping dots indicated in FIG. 3.

This simplest 2×2 overlapping matrix leads to only 16 possible combinations of overlap from the four binary signals representative of the four possible dots about the window in FIG. 3. Referring to FIG. 4, there is shown in bold outline a window W indicative of the same window shown in FIG. 3, and overlap patterns $P_0$–$P_{15}$, indicating various degrees of dot overlap fill factor or contribution P to window W by elliptically shaped printed dots 43, 46, and 47. Accordingly, an output function now has a maximum of 16 independent parameters which can be expressed as 16 different overlapping patterns for a black-and-white digital printer.

Centering can be extended from black-and-white printing to color printing. The difference between color and black-and-white printing is that in color printing each dot has more than two possible colors. Under the conventional approach, a color pattern within the defined window depends on the status of nine dots in a 3×3 dot matrix, i.e., one dot centered and eight adjacent dots (similar to black-and-white dot printing in FIG. 2). If there are N possible primary color choices for each color dot, then the total number of possible arrangements with the nine dots is $N^9$. In a CMY digital color printer N equals eight, representing the eight possible primary colors: cyan, magenta, yellow, red, green, blue, black-and-white. This results in $8^9$ or 134,217,728 possible dot arrangements.

Applying the centering, in accordance with the present invention, the color printed dots are centered at the intersecting points of lines in a virtual screen having the X' Y' coordinate system shown in FIG. 3. Now, only four color dots are present in a 2×2 matrix defined by the vertices of any opening on the virtual screen, similar to the window W in FIG. 3. It may be assumed that dots with the same color have about the same shape and size, which is usually the case for color printers. The total number of possible arrangements of the four dots is $N^4$. Thus, for a CMY digital color printer there are $8^4$ or 4096 possible color dot arrangements, a substantial reduction from the conventional approach.

If the shape of the dots is symmetric about both the X' and Y' directions, the total number of independent 2×2 (i.e. 2 by 2) dot arrangements can be reduced. For color printers with N primary dot colors, the total number of required independent and distinct patterns P(N) for N primary colors may be expressed by:

$$P(N) = \frac{N!}{(N-4)!x4!} x6 + \frac{N!}{(N-3)!x3!} x9 + \frac{N!}{(N-2)!x2!} x5 + \frac{N!}{(N-1)!}$$

where N>3. In a CMY digital color printer N=8 and P(8)=1072. The symmetry property is best illustrated by the two color case. When N=2, representing black-and-white printing, the first two terms of the above equation become zero, and P(2)=7. For example, using this symmetry property of dot overlap the 16 patterns shown in FIG. 4 are reduced to the seven independent overlap patterns: $P_0$, $P_1$, $P_3$, $P_5$, $P_6$, $P_7$, and $P_{15}$.

For all distinct patterns of the four dots, test patterns are generated as an input to the digital printers during calibration which are independent of the printers' halftone rendering. These test patterns periodically repeat their corresponding 2×2 dot pattern in both X' and Y' directions. Thus, in black-and-white printing the printer produces an output of seven test patterns (see example of dot patterns in FIG. 8), while in CMY color printing the printer produces an output of 1072 test patterns. Each test pattern consists of one and only one independent 2×2 dot pattern for symmetric equivalents. Each printer is characterized by its particular output of these test patterns.

The printed output of the test patterns is evaluated to provide halftone calibration information (also referred to as halftone correction information) for the characterized printer. In black-and-white printing, the average reflectance values (or transmittance values for transparent media) are measured from each of the seven output test patterns. These measured reflectance values are normalized to the range of the multi-level signals representing a digitized gray-scale continuous-tone image (e.g., 0 to 255 for 8 bit gray-scale) to provide a set of normalized 2×2 dot overlap coefficients G. In color printing, the average color output is measured for each of the test patterns. These measured average color values are normalized to the range of multi-level color signals (i.e., in RGB with levels represented by 8 bits for each color channel) representing the continuous-tone color image to provide a set of normalized 2×2 color dot overlap coefficients Gr, Gg and Gb for the color printer. (The multi-level color signals are described herein as in a RGB format, however other multi-channel color data formats may be used, such as XYZ.) The above evaluation of the test pattern output is made possible because all the windows, as defined in FIG. 3, of the printed test pattern output have an identical average output values due to the symmetry property of the dots. Measuring the average color values is more efficient and accurate than microscopically measuring a small dot overlap region. After the halftone calibration information, i.e., normalized 2×2 dot coefficients, is obtained it can then be used to produce dot overlap corrected images as described below.

For black-and-white digital printers, the calibration information is used to produce a dot overlap corrected image by either ordered-dithering or error diffusion halftoning techniques. The use of error diffusion halftoning techniques is described in detail in the cited co-pending application.

Referring now to FIGS. 5–10, the first embodiment of the present invention is shown for producing a dot overlap corrected halftone image with a black-and-white digital printer by ordered-dithering halftoning responsive to calibration information obtained for the particular digital printer. Generally, ordered-dithering halftoning uses a dithering screen comprising a two-dimensional grid with elements, or openings, which correspond to the multi-level digital image signals, i.e., pixels, of a digitized two-dimensional continuous-tone image. The digitized two-dimensional continuous-tone image is represented by two-dimensional multi-level digital image signals $D(i,j)$, where i and j are indexes referring to the spatial coordinates of $D(i,j)$. $D(i,j)$ may be described as an i by j array of pixels, each pixel having a multi-level signal, such as 8 bit gray-scale. The following description of this embodiment is illustrated using a spiral 3×3 screen, although the screen may be shaped or sized differently. Each opening in the dithering screen has a threshold level within the range of the multi-level digital image signals $D(i,j)$, such as 8 bit gray-scale (0 to 255).

To halftone $D(i,j)$, the dithering screen is aligned over a portion of the pixels in $D(i,j)$, such that a 3×3 group of nine pixels appear in the screen openings. The multi-level signals representing the pixels at the openings are compared with the threshold levels of the openings to generate binary image signals $B(i,j)$. For example, if the pixel at $D(i,j)$ has a representative signal greater than the opening's threshold level, the pixel in $B(i,j)$ is represented by an absent dot and is white, $B(i,j)=1$, otherwise the pixel is represent by a black dot, $B(i,j)=0$. Generally, the order of the threshold levels of openings in the dithering screen defines the desired pattern, such as spiral.

The conventional way of generating a dithering screen will now be described. In general, a screen with a total of N openings can produce N+1 different gray-scale levels. At each gray-scale level, n out of N openings of the screen are printed black and N−n openings are left white, where n=0,1,2, . . . , N. The N+1 gray levels are represented by N/N, (N−1)/N, (N−2)/N, . . . , 0/N, respectively, with a gray level span from 0, representing black, to 1, representing white.

Figure 5:
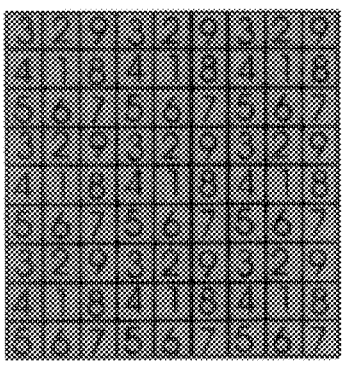
FIG. 5 shows enlarged illustrations of the 10 different gray levels in generating a 3×3 (i.e. 3 by 3) pixel spiral ordered dithering screen in accordance with the prior art, wherein the shape of the dots is square. These illustrations use an orthogonal coordinate system to provide a grid where the dots are centered at centers of grid openings.

Referring to FIG. 5., there are shown ten patches representing the ten gray levels produced by the spiral 3×3 screen, which has a total of 9 openings. In each patch the screen periodically repeats the same 3×3 pattern of black-and-white dots. These patches represent gray levels 9/9, 8/9, 7/9 . . . , 0/9.

For idealized pixels, which have perfect square shaped dots to fill in the openings defined by the screen, the sequence of filling the screen is irrelevant to the values of the gray levels. The dithering screen is used as a threshold matrix and the threshold level of each element is chosen as the average of the two gray levels before and after filling the particular opening by a black dot. Thus, the first element of the screen has the threshold in terms of gray levels of $$\frac{\frac{N}{N} + \frac{N-1}{N}}{2}, \text{or} \frac{2N-1}{2N}, \tag{1}$$

the second element is $$\frac{2N-3}{2N}$$

and so on.

In digital halftoning of 8-bit gray-scale images, the values of pixels $D(i,j)$ range from black, 0, to white, 255. The threshold levels calculated based on the gray level for the spiral 3×3 dithering screen are shown below in Table 1.

TABLE 1

| Patch (n/N) | Gray Level | Threshold |
|---|---|---|
| 0/9 | 255 | |
| | | 242 |
| 1/9 | 228 | |
| | | 213 |
| 2/9 | 199 | |
| | | 185 |
| 3/9 | 171 | |
| | | 156 |
| 4/9 | 142 | |
| | | 128 |
| 5/9 | 114 | |
| | | 100 |
| 6/9 | 85 | |
| | | 71 |
| 7/9 | 57 | |
| | | 43 |
| 8/9 | 28 | |
| | | 14 |
| 9/9 | 0 | |

The gray levels of the patches shown in Table 1 are calculated by generating equal divisions between the highest (255) and lowest (0) gray-scale levels, where the interval between each division is 256 divided by N (9), i.e., 28.444. Each threshold level is calculated by averaging two gray levels which differ by one black dot. For example, the gray levels of the 0/9 and 1/9 patches are 255 and 228, respectively; thus the threshold level is 242, i.e., (255+228) divided by 2. The same result can be obtained by multiplying expression (1) when N=9, the threshold of the first element, by the gray-scale range, i.e., (17/18)256=241.78 (rounded to 242). The 3×3 spiral dithering screen from the threshold levels of Table 1 is:

| | | |
|---|---|---|
| 185 | 213 | 14 |
| 156 | 242 | 43 |
| 128 | 100 | 71 |

The above described conventional way of generating a dithering screen presumes that the digital printer outputs perfectly square-shaped dots. In actuality printed dots are not perfect squares, and adjacent dots overlap each other. The amount of this overlap is a function of the particular printer, as defined by the obtained halftone calibration information. Thus, a new dithering screen is needed with recalculated threshold levels which account for dot overlap at the printer.

Figure 6:
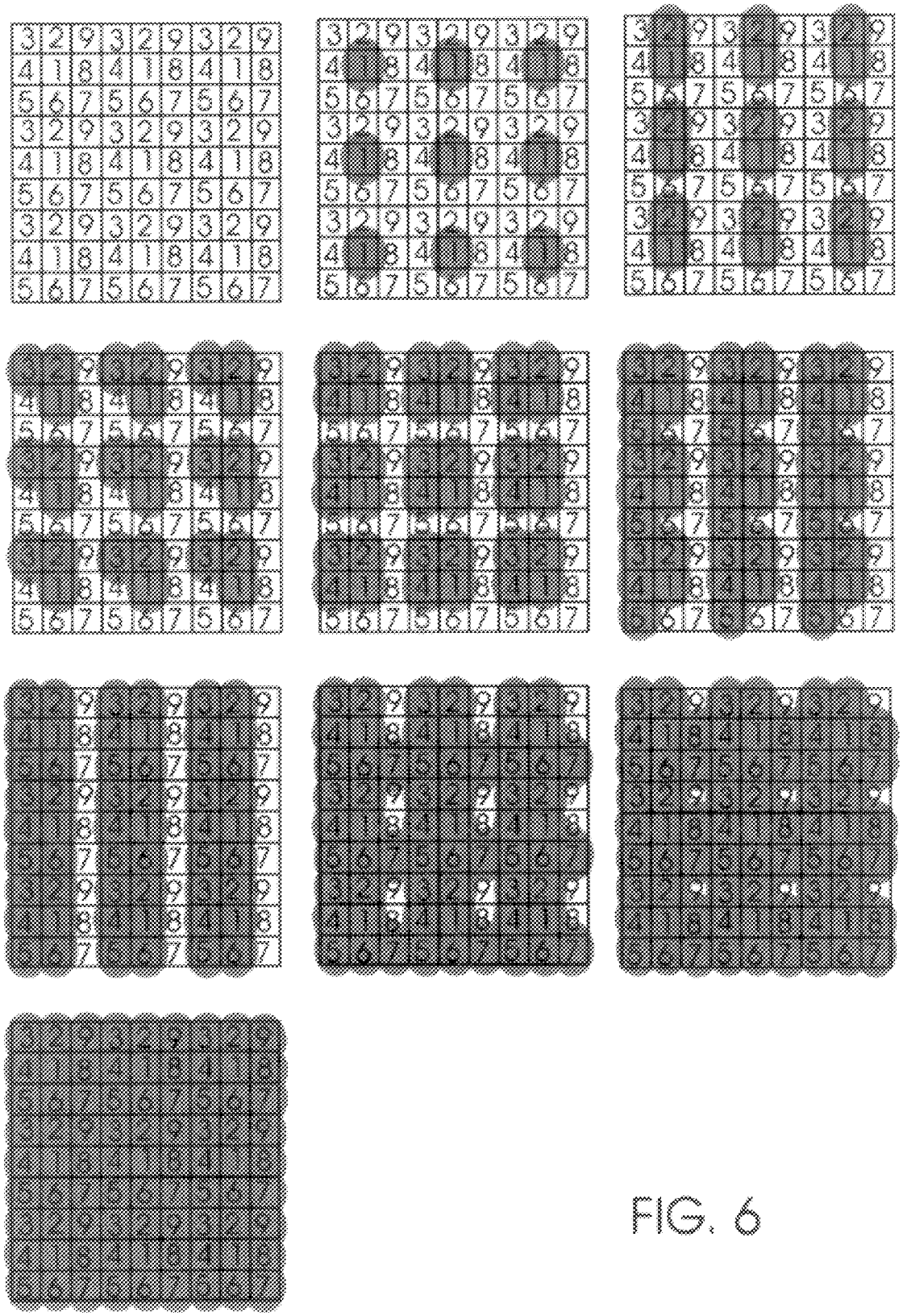
FIG. 6 shows the same illustrations of FIG. 5 with circular dots, wherein adjacent circular dots overlap each other.

To illustrate the determination of a dot overlap-corrected dithering screen, consider the uncorrected 3×3 dithering screen described above. Referring to FIG. 6, the ten patches of FIG. 5 are redrawn with circular black dots. Note that now the gray levels do not change linearly with the number of black dots printed, and that the actual gray levels depend on the characteristics of the shape and the size of the physical output dots. Also, the actual gray levels depend on the sequence in which the screen openings are filled by the black dots in the ten patches.

To recalculate the gray levels, the patches must be analyzed for dot overlap. The patches are first generated as virtual output images. In other words, these images are never physically printed. The virtual output images have progressively greater number of black dots, corresponding to the descending order of threshold levels in the uncorrected dithering screen, at screen openings. Thus, for example, the uncorrected 3×3 dithering screen generates the virtual output images as shown by the patches in FIG. 6.

Figure 7:
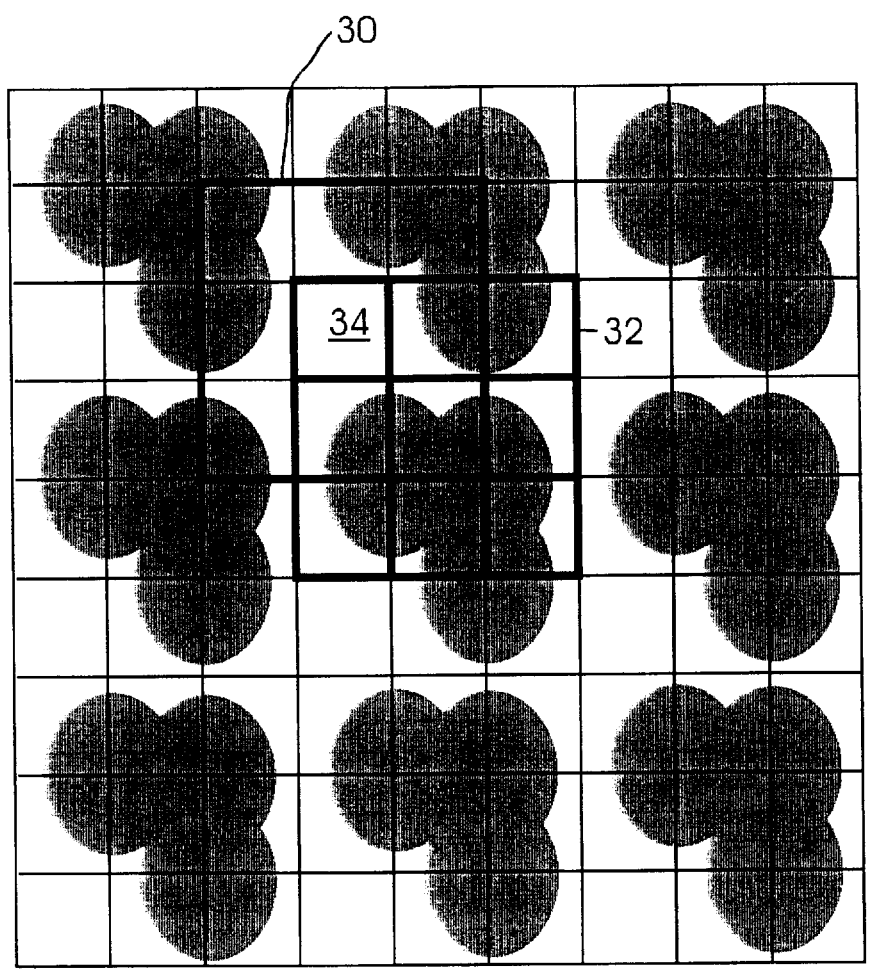
FIG. 7 is the fourth illustration of FIG. 6 (counting left to right from top) wherein the coordinate system has been shifted, as shown in FIG. 3, to provide a virtual screen having orthogonal intersecting lines such that circular dots are centered at intersections of the lines.

Referring now to FIG. 7, the fourth virtual output image of FIG. 6 (counting left to right from top) will be used to illustrate the procedure for recalculating the gray level of a virtual output image. As shown in FIG. 7, a two-dimensional virtual screen having a coordinate system of orthogonally intersecting lines is positioned upon the virtual output image, wherein the dots of the image are centered at the intersections of the screen lines. Otherwise stated, the grid representing the virtual screen has a coordinate system shifted by one half openings in both the X and Y directions from the conventional coordinate system where printed dots coincide with the openings in the grid. This aspect of the system of this invention is described above in connection with FIG. 3.

A region having the same size and shape as the uncorrected 3×3 dithering screen is then selected from the virtual output image of FIG. 7 defined by the shifted coordinate system of the virtual screen. Regions 30 and 32 are examples of such regions, however, the region may be defined anywhere upon the virtual output image because of its periodic properties. For purposes of this explanation of the invention, region 32 is selected. The first opening 34 in region 32 is evaluated by examining the 2-dot by 2-dot pattern at the vertices of opening 34. This 2-dot by 2-dot pattern is compared with the calibrated 16 patterns shown in FIG. 4. The halftone calibration information is stored in a look-up-table, wherein for each possible pattern, the corresponding normalized coefficient may be referenced. This table is formed by expanding the seven distinct test patterns to their symmetric equivalents for $P_0$–$P_{16}$ of FIG. 4. By referencing the look-up-table, the stored coefficient corresponding to the 2-dot by 2-dot pattern ($P_0$) is chosen to represent the gray level of opening 34. The above is successively repeated for each opening in region 32 to provide nine representative levels. These nine levels are summed together and divided by nine to provide the average gray level representative of the selected virtual output image.

The above procedure is repeated for each virtual output image, and the resulting gray levels are used to recalculate the threshold levels, where each threshold level is calculated by averaging two gray levels which differ by one black dot. These recalculated threshold levels are substituted for the threshold levels in the uncorrected ordered dithering screen to provide a corrected dithering screen. Preferably, the first and last virtual output image of FIG. 6 do not require recalculation of their gray levels because they represent the highest and lowest gray-scale levels, i.e., 255 and 0. Furthermore, each virtual output image may be generated successively by adding one dot to the dithering screen of the previous virtual output image for each gray level calculation.

An example of the above procedure for generating a corrected dithering screen will now be described for the 3×3 spiral dithering screen. Assume, for example, that the halftone calibration information for a digital printer is given by the following normalized coefficients: 255, 141, 80, 72, 36, 15, and 0. Thus, in the look-up-table:

$$P_0 \rightarrow 255$$
$$P_1, P_2, P_4, P_8 \rightarrow 141$$
$$P_3, P_{12}, \rightarrow 80$$
$$P_5, P_{10} \rightarrow 72$$
$$P_6, P_9 \rightarrow 36$$
$$P_7, P_{11}, P_{13}, P_{14} \rightarrow 15$$
$$P_{15} \rightarrow 0.$$

For region 32 in FIG. 7 the openings, corresponding from top to bottom and left to right have the following nine gray levels: 255 ($P_0$), 141 ($P_2$), 141 ($P_1$), 141 ($P_8$), 80 ($P_{12}$), 141 ($P_4$), 141 ($P_2$), 15 ($P_{11}$), and 72 ($P_5$). The sum of these nine values is 1127, which divided by 9 results in an average representative value of 125 (125.2). After the gray levels of the other eight virtual output images are similarly calculated, the threshold levels are calculated as shown in Table 2.

TABLE 2

| Patch (n/N) | Gray Level | Threshold |
|---|---|---|
| 0/9 | 255 | |
| | | 230 |
| 1/9 | 205 | |
| | | 186 |
| 2/9 | 166 | |
| | | 146 |
| 3/9 | 125 | |
| | | 112 |
| 4/9 | 99 | |
| | | 84 |
| 5/9 | 70 | |
| | | 62 |
| 6/9 | 53 | |
| | | 38 |
| 7/9 | 24 | |
| | | 16 |
| 8/9 | 7 | |
| | | 4 |
| 9/9 | 0 | |

Finally, the three by three dithering screen corrected for dot overlap is shown by the following table:

| | | |
|---|---|---|
| 146 | 186 | 4 |
| 112 | 230 | 16 |
| 84 | 62 | 38 |

Figure 9:
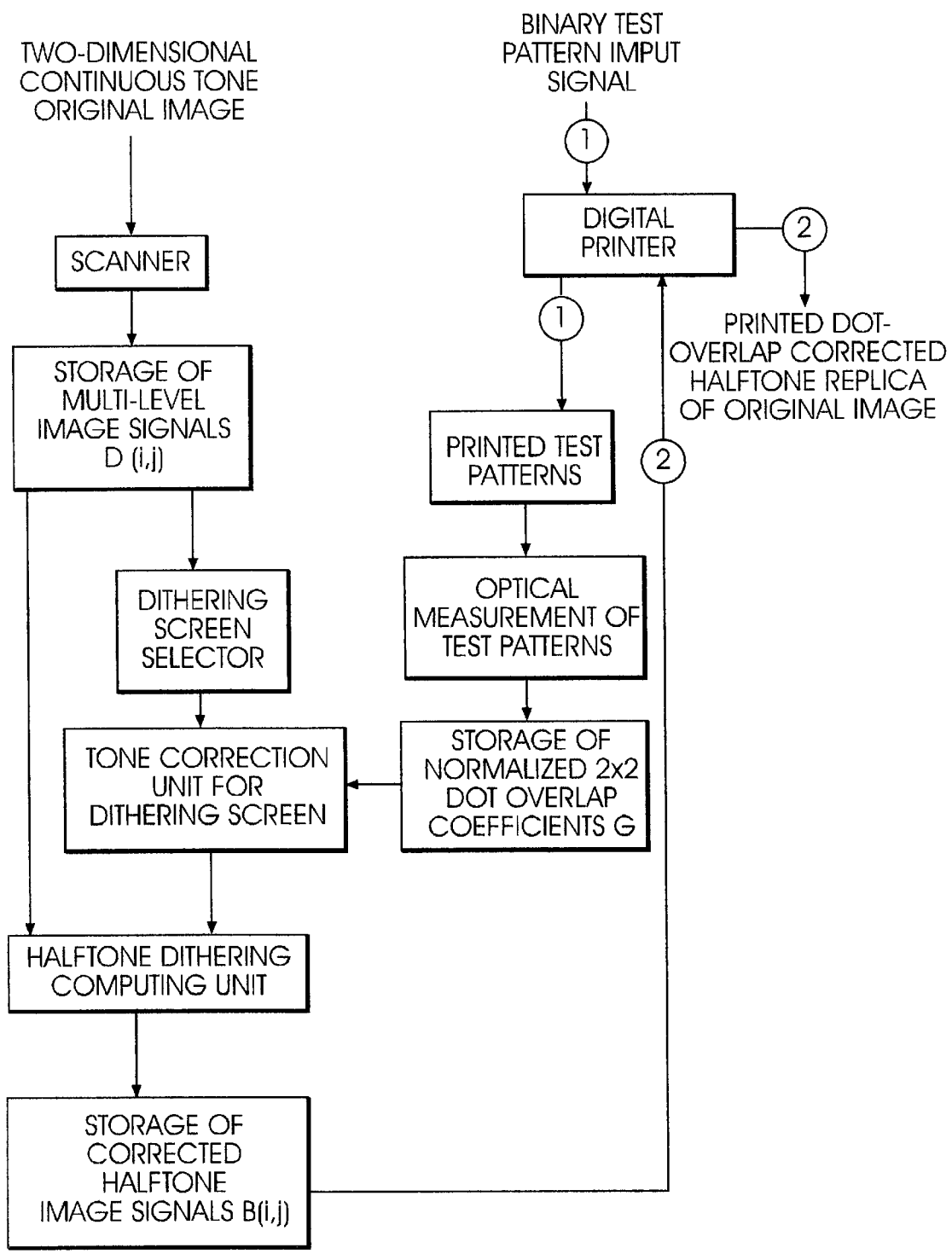
FIG. 9 is a block diagram of the halftone correction system in accordance with the first embodiment of the present invention.

The above described procedure for generating the corrected dithering screen is part of the system in FIG. 9.

Referring to FIG. 9, a block diagram of the system for producing a dot overlap corrected halftone image of a two-dimensional continuous-tone image is shown for a particular digital printer. This system includes a scanner and a black-and-white printer, which are both coupled to a computer (not shown in FIG. 9). (Coupled preferably by being connected to each other.) The computer operates according to a set of instructions, and the scanner and printer operate responsive to the computer. All blocks, except blocks related to the scanner and printer calibration for measuring printed test patterns, are performed by the computer. However, these blocks may also represent separate components which are integrated together.

In FIG. 9, path 1 represents the calibration of the black-and-white printer as described earlier. Calibration is performed by sending binary test pattern input signals representing the seven test patterns from the computer to the digital printer. The printer produces an output for each test pattern as a patch of arranged printed dots. Next, each test pattern is measured to provide an average value of reflectance (or transmittance) of light by an optical measurement device, such as a densitometer. The results are placed in storage, such as in the form of the above described look-up-table, as normalized average values to provide a set of 2×2 dot overlap coefficients G. "Storage" may be provided by RAM in the computer. These coefficients represent the halftone correction information for the black-and-white printer which produced the output of the test patterns. Calibration of the printer should be periodically performed to account for any changes in printer performance, and whenever a variation occurs at the printer, such as changing ink or printer media.

The generation of a dot overlap corrected halftone image of a continuous-tone gray-scale image is initiated by scanning a two-dimensional continuous-tone image with the scanner. This scanner produces multi-level digital image signals which represent the continuous-tone image as a two-dimensional array of pixels, where each pixel has a gray-scale level. These signals are placed in storage and defined by $D(i,j)$.

A dithering screen selector then selects an uncorrected ordered dithering screen. This screen is sent to the tone correction unit which produces an overlap corrected ordered dithering screen responsive to the stored normalized coefficients.

Figure 8:
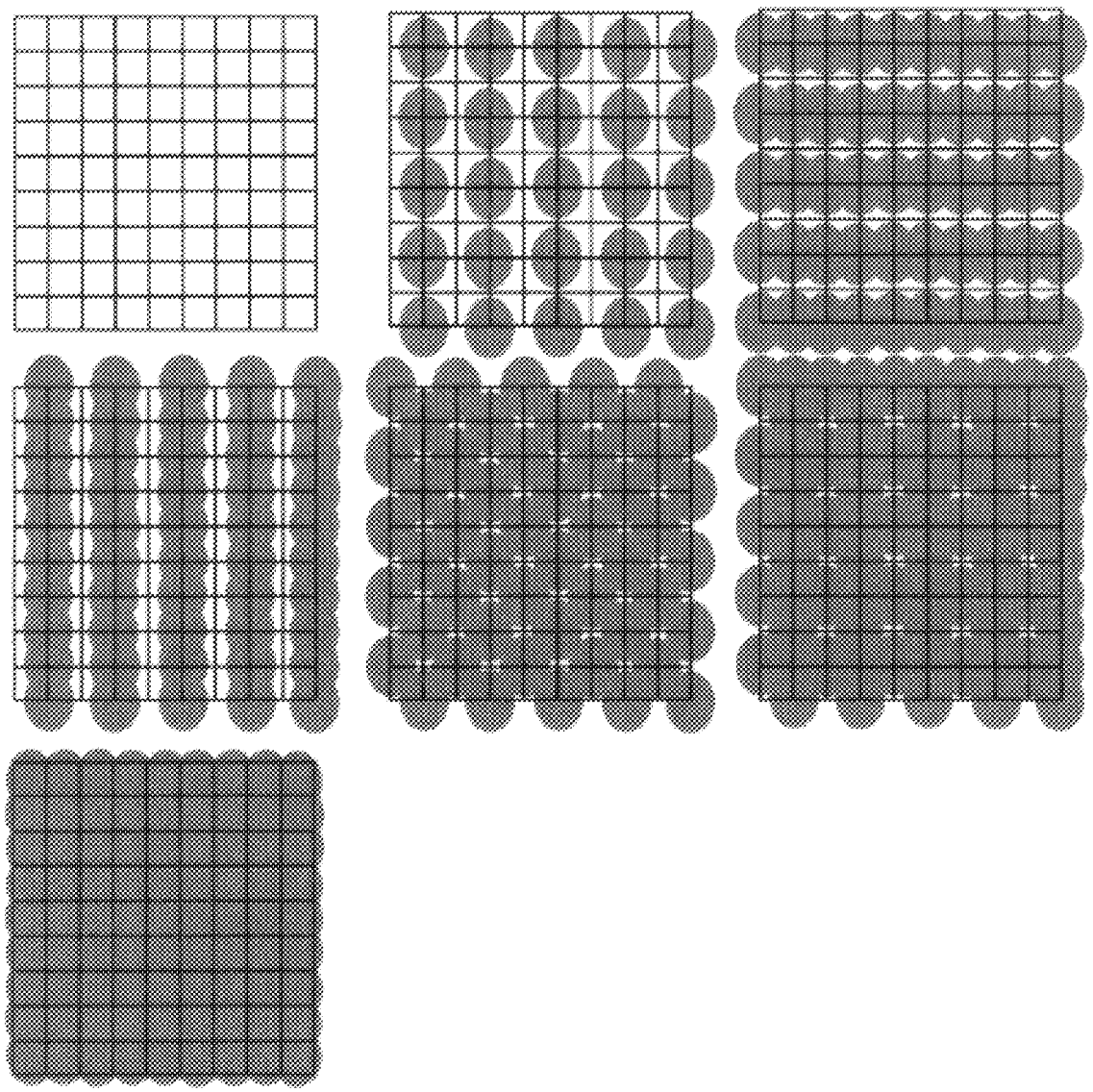
FIG. 8 shows illustrations of the 7 test patterns which are printed by a black-and-white printer to provide the halftone calibration information. These illustrations use a coordinate system with orthogonally intersecting lines such that dots are centered at intersections of the lines.
Figure 10:
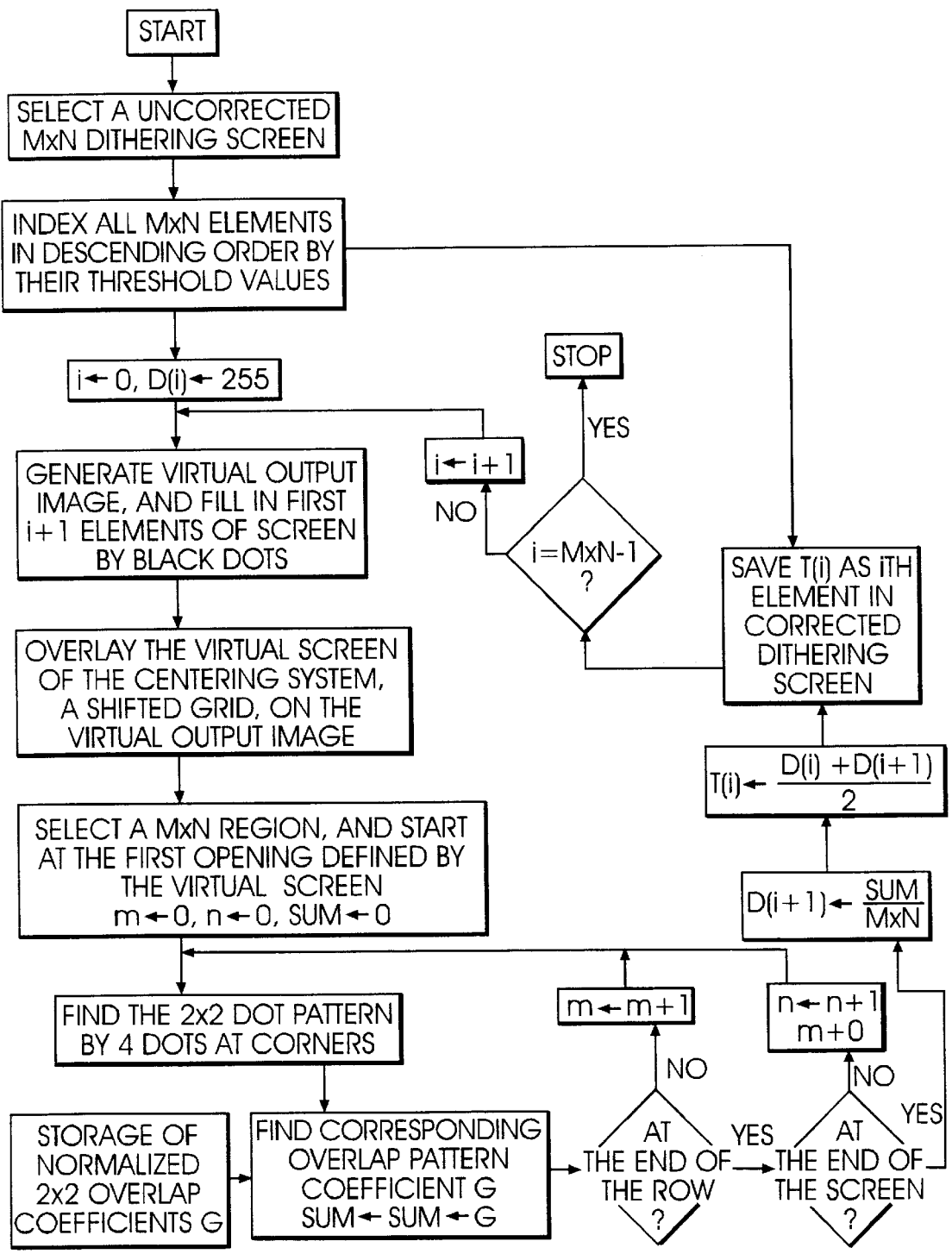
FIG. 10 is a flow chart of the program for the part of the system shown in FIG. 9 which generates a dot overlap corrected ordered dithering screen.

Referring to FIG. 10, a flow chart is shown detailing the operations of the program in the dithering screen selector and tone correction unit to produce a dot overlap corrected dithering screen in the manner already described in connection with FIGS. 6–8. First, an uncorrected dithering screen with M×N openings is selected. Next, all M×N elements are indexed by i in a descending order by their threshold levels. Index i is reset to zero, and $D(i)$ is set to 255, where $D(i)$ stores the recalculated gray levels used to generate the thresholds of the corrected screen.

A virtual output image is then generated, and the first i+1 elements, or openings, of the dithering screen in the virtual output image are filled with black dots. Thus, when i=0, only the opening with the highest threshold level is filled with a black dot. A two-dimensional virtual screen having orthogonally intersecting lines is then positioned upon the virtual output image, where the black dots of the virtual output image are centered at the intersections of the virtual screen lines. An M×N region of dots on the virtual output image is selected. Next, m and n are set to zero, where m and n are indexes to the openings in the M×N region upon the virtual screen. Sum is set to zero. Starting at the first opening in the M×N region (m=0, n=0) a group of 4 adjacent dots in a 2×2 dot pattern at the vertices of the opening is selected. The coefficent G of the test pattern matching the 2×2 dot pattern of this selection, and added to Sum. Thereafter, m and n are indexed to the next opening in the M×N region, and a second group of four adjacent dots in a 2×2 dot pattern is selected, and the stored coefficient G corresponding to the pattern is added to Sum. The above procedure repeats in this manner until the final opening of the M×N region is reached. Afterwards, $D(i+1)$ is set to Sum divided by the product of M multiplied by N to provide an average gray level representing the virtual output image. Threshold $T(i)$ is set to $(D(i)+D(i+1))$ divided by 2, and then $T(i)$ is placed as the threshold level for the $i^{th}$ opening in the corrected dithering screen.

Next, the system checks whether every threshold level has been calculated in the corrected dithering screen, i.e., does i=M×N−1? If so, then generating corrected dithering screen is completed, otherwise i is increased by one and the next virtual output image is generated with i+1 elements of its repeating dithering screens filled in with black dots, and the above procedure repeats to provide the next threshold $T(i)$.

Referring back to FIG. 9, after all the thresholds have been calculated for the corrected dithering screen a halftone dithering computing unit uses the corrected dithering screen to halftone the stored multi-level image signals $D(i,j)$ to produce corrected halftone binary image signals $B(i,j)$. $B(i,j)$ are then placed in storage. To generate the dot overlap corrected halftone image at the digital printer, the digital printer receives the stored $B(i,j)$ and prints the dot overlap corrected halftone image responsive to $B(i,j)$.

Figure 11:
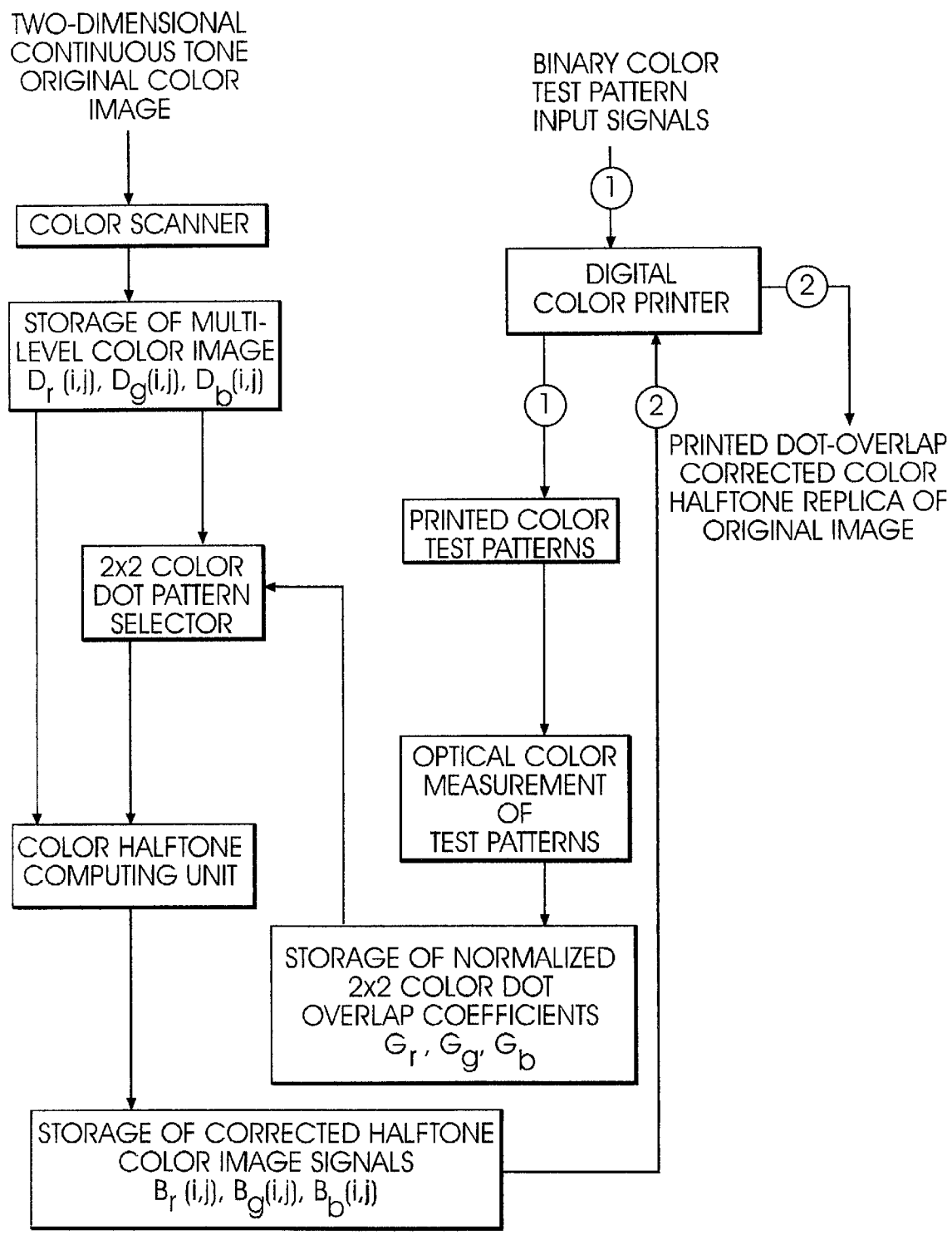
FIG. 11 is a block diagram of the halftone correction system in accordance with the second embodiment of the present invention where error diffusion color halftoning is applied.

Referring now to FIGS. 11–14, the second embodiment of the present invention is shown for producing dot overlap corrected color halftone images on a digital color printer (or digital color press). FIG. 11 shows a block diagram of a system for producing a dot overlap corrected color halftone image from a two-dimensional continuous-tone color image at a particular digital color printer using error diffusion techniques. In describing this system, the digital printer is assumed to be of a CMY type, however, other types of color digital printers may be used. This system includes a color scanner and a digital color printer, which are both coupled to a computer (not shown in FIG. 11). (Coupled preferably by being connected to each other). The computer operates according to a set of instructions. All blocks in FIG. 11, except those related to the scanner and measuring the printed test patterns, are performed by the computer. However, these blocks may also represent separate components which are integrated together.

In FIG. 11, path 1 represents the calibration of the digital color printer, as earlier described. Calibration is performed by sending binary color test pattern input signals representing the 1072 test patterns from the computer to the digital color printer. The printer then produces an output for each color test pattern as a patch of arranged printed color dots. Each test pattern is measured to provide average color values of reflectance of light, by color measuring devices, such as GRETAG calorimeter. The measurement results are expanded to their symmetrical equivalents to provide the 4096 possible combinations of a 2-dot by 2-dot grouping, and are placed in storage as normalized color dot overlap coefficients $G_r$, $G_g$, $G_b$. Such storage can be in the form of a look-up-table corresponding to the 4096 possible combinations. These stored color dot overlap coefficients represent the halftone correction information for the digital color printer. This calibration should be periodically performed to account for any changes in the printer that may occur over time, and whenever variation occurs at the printer, such as changing inks or printer media.

Path 2 in FIG. 11 represents the components for producing a dot overlap corrected color halftone image responsive to the stored halftone correction information. This procedure is initiated by scanning a two-dimensional continuous-tone color image with a color scanner, and followed by placing the multi-level color image signals $D_r(i,j)$, $D_g(i,j)$, $D_b(i,j)$, produced by the color scanner into storage. $D_r(i,j)$, $D_g(i,j)$, $D_b(i,j)$ represent three color channels (red, green, and blue) for a two-dimensional color pixel array, where i and j are indexes to the color pixels in the array. Each color pixel thus has three valves, which in a 8 bit example range from 0 to 255.

Halftoning of the multi-level digital color image signals is performed by a 2×2 color dot pattern selector, a color halftoning computing unit, and storage for the binary overlap corrected halftone color image signals. The halftoning operation is described in detail in FIG. 12.

The system utilizes a two-dimensional virtual image screen, or grid, with orthogonally intersecting lines defining a multiplicity of rectangular-shaped openings. This virtual screen is superimposed onto the two-dimensional multi-level image so that each opening corresponds to one color pixel of the image signals $D_r$, $D_g$ and $D_b$. The halftoning operation is conducted sequentially starting from the upper-left corner. While halftoning process continues, virtual color dots, represented by the binary color image signals $B_r$, $B_g$ and $B_b$, are placed on the virtual screen one by one, so that each virtual color dot is centered at an intersection of the virtual image screen. Indexes i, j are used for both the multi-level color image signals $D_r$, $D_g$, $D_b$ and the binary color image signals $B_r$, $B_g$, $B_b$, with half-pixel shift in both X and Y dimensions. Thus, the opening corresponding to the color pixel of $D_r(i,j)$, $D_g(i,j)$ and $D_b(i,j)$ is surrounded by four virtual color dots centered at four vertices of this opening and represented by the binary color signals: $B_r(i-1, j-1)$, $B_g(i-1, j-1)$, $B_b(i-1, j-1)$ at the upper-left vertice, $B_r(i, j-1)$, $B_g(i, j-1)$, $B_b(i, j-1)$ at the upper-right vertice, $B_r(i-1, j)$, $B_g(i-1, j)$, $B_b(i-1, j)$ at the lower-left vertice and $B_r(i,j)$, $B_g(i,j)$, $B_b(i,j)$ at the lower-right vertice.

Figure 12:
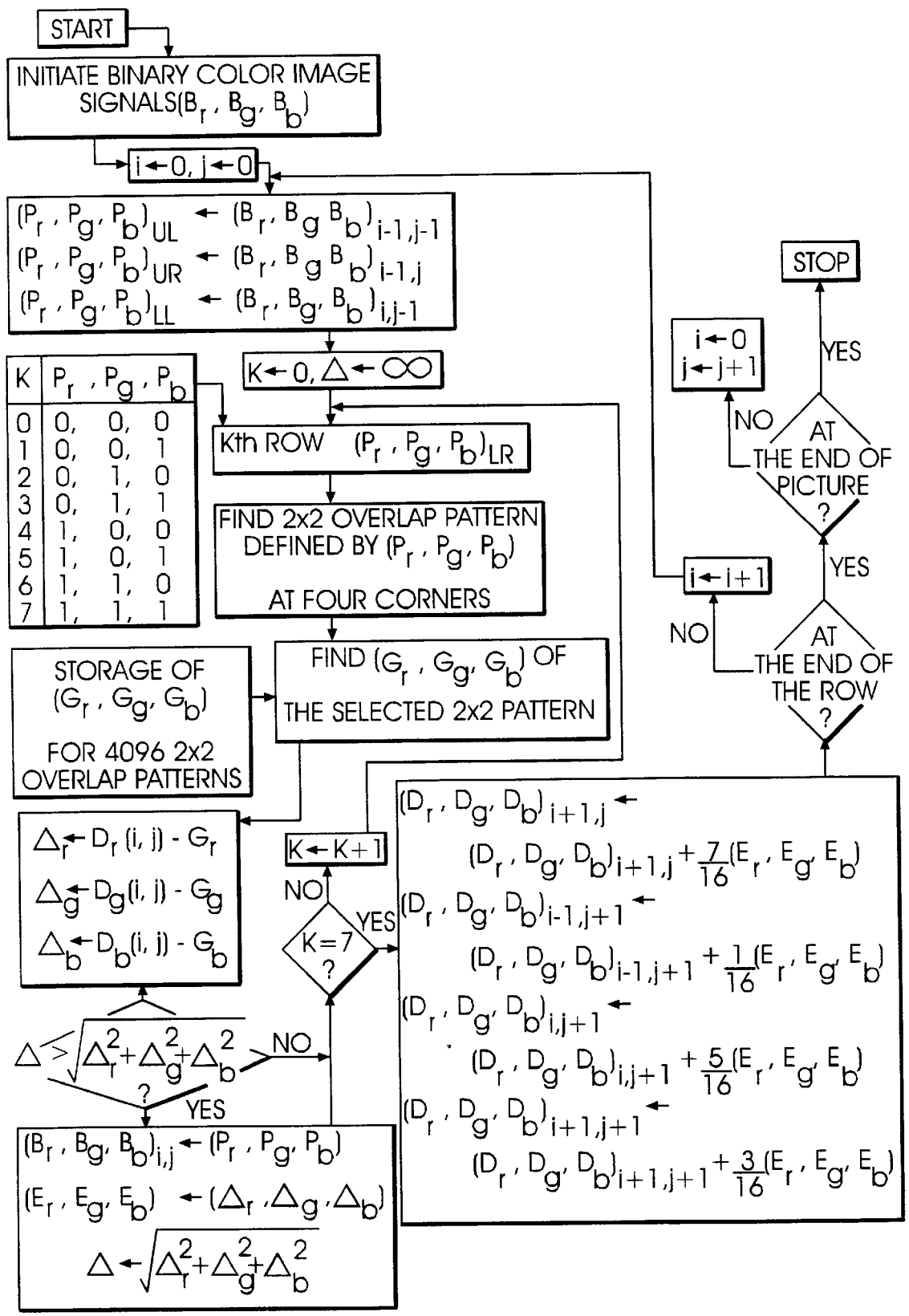
FIG. 12 is a flow chart of the program for the part of the system shown in FIG. 11 which produces dot overlap corrected halftone images responsive to stored multi-level color image signals and the halftone correction information.

Referring to FIG. 12, the system first initializes the binary color image signals $B_r(i,j)$, $B_g(i,j)$, $B_b(i,j)$ at row j=−1 and column i=−1, where virtual white dots are placed. In other words, the binary color signals $B_r(i,j)$, $B_g(i,j)$, $B_b(i,j)$, for dots at column i=−1 and row j=−1 are all set to 1. Although these white dots are stored, they will not be part of the input later sent to the digital color printer and will be used only for the halftoning process described below.

Indexes i and j are then set to zero. Two-dimensional successive groups of adjacent color dots defined by a 2-dot by 2-dot pattern on the virtual image screen is then constructed. Each group lies at the vertices of an opening on the virtual screen. The entire procedure is carried out sequentially from left to right and from top to bottom. For each selected group, the binary color signals of three out of four adjacent color dots in the group are determined by previous calculations or during initialization, i.e.:

$$(P_r, P_g, P_b)_{UL} \leftarrow (B_r, B_g, B_b)_{i-1,j-1}$$
$$(P_r, P_g, P_b)_{UR} \leftarrow (B_r, B_g, B_b)_{i-1,j}$$
$$(P_r, P_g, P_b)_{LL} \leftarrow (B_r, B_g, B_b)_{i,j-1}$$

where $(P_r, P_g, P_b)_{UL}$ represents the binary color signals of the upper-left dot in a 2-dot by 2-dot group, $(P_r, P_g, P_b)_{UR}$ represents the binary color signals of the upper-right dot in the group, and $(P_r, P_g, P_b)_{LL}$ represents the lower-left dot in the group. When both i and j equal zero, these three dots are white dots. The binary signal of the lower-right dot $(P_r, P_g, P_b)_{LR}$ is found by evaluating all possible patterns using eight possible primary colors (represented by k=0 to 7) for the LR dot along with the previously determined UL, UR and LL dots.

For each k, a 2×2 pattern of the four dots of the group is provided, and the coefficients $G_r$, $G_g$, $G_b$ corresponding to the color test pattern representative of the 2-dot by 2-dot pattern are read from the storage. The error in each channel ($\Delta_r$, $\Delta_g$, $\Delta_b$) is the calculated difference between the multi-level image signals $D_r(i,j)$, $D_g(i,j)$, and $D_b(i,j)$, the color pixel located at the virtual screen opening between the four dots of the group, and the read $G_r$, $G_b$, and $G_g$. The combined error term $\Delta$ is given by $\Delta=(\Delta_r^2+\Delta_g^2+\Delta_b^2)^{1/2}$. The 2×2 pattern, which coincides with the lowest error term $\Delta$ among the eight possibilities, is chosen. The binary color signals of the LR dot of the chosen 2×2 pattern $(P_r, P_g, P_b)$ is set to $(B_r, B_g, B_b)_{i,j}$. Error signals $E_r$, $E_g$, $E_b$ are then set to the corresponding errors $\Delta_r$, $\Delta_g$, and $\Delta_b$ which were calculated from $G_r$, $G_b$, and $G_r$ of the chosen color 2×2 pattern.

Error signals $E_r$, $E_g$, and $E_b$ are then divided into proportions and diffused, or added, to surrounding pixels of the multi-level digital color signals which have no binary color signals yet calculated, i.e., to pixels which have not been selected by any 2-dot by 2-dot grouping. This may be in accordance with the following rules:

$$(D_r, D_g, D_b)_{i+1,j} \leftarrow (D_r, D_g, D_b)_{i+1,j} + (7/16)((E_r, E_g, E_b)$$
$$(D_r, D_g, D_b)_{i-1,j+1} \leftarrow (D_r, D_g, D_b)_{i-1,j+1} + (1/16)(E_r, E_g, E_b)$$
$$(D_r, D_g, D_b)_{i,j+1} \leftarrow (D_r, D_g, D_b)_{i,j+1} + (5/16)(E_r, E_g, E_b)$$
$$(D_r, D_g, D_b)_{i+1,j+1} \leftarrow (D_r, D_g, D_b)_{i+1,j+1} + (3/16)(E_r, E_g, E_b)$$

After the error signals are diffused, the next successive group of 2×2 pattern of adjacent color dots is selected by indexing i and j accordingly. The above procedure repeats until i and j have been advanced to the end of the two-dimensional multi-level color image signals, then storage of the corrected halftone color image in $B_r(i,j)$ $B_g(i,j)$ $B_b(i,j)$ is complete.

Referring back FIG. 11, the stored corrected halftone color image signals are then sent to the digital color printer. The digital color printer responsive to these image signals prints a dot overlap corrected color halftone image which is representative of the original two-dimensional continuous-tone color image. Typically, digital color printers translate the red, green, and blue color channels of the halftone image signals into the CMY colors prior to printing.

Figure 13:
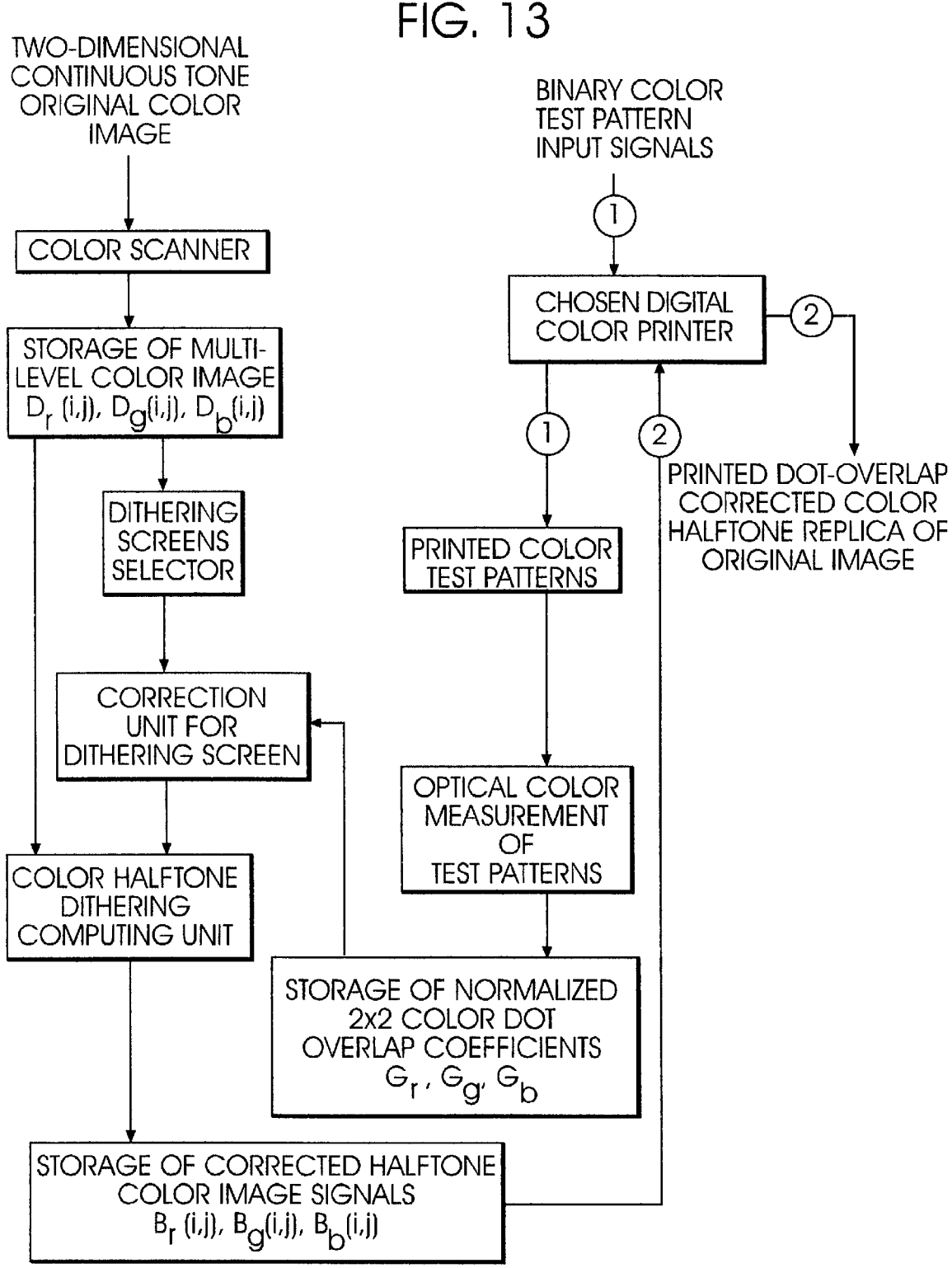
FIG. 13 is a block diagram of the halftone correction system in accordance with the second embodiment of the present invention where ordered dithering color halftoning is applied.

Color halftoning of the continuous-tone color image may also be performed by ordered dithering halftoning, as shown in the system of FIG. 13. This halftoning method involves using a dithering screen, as described in the first embodiment for black-and-white digital printers, for each color channel. The operation of the system of FIG. 13 is the same as shown in the system of FIG. 11 except that the corrected halftone color image signals is produced by a set of dot overlap corrected color dithering screens, i.e., the manner in which $D_r(i, j)$, $D_g(i, j)$, $D_b(i, j)$ are processed into $B_r(i, j)$, $B_g(i, j)$, $B_b(i, j)$. Specifically referring to FIG. 13, uncorrected dithering screens for all color channels are selected by a dithering screens selector. Thereafter, a correction unit produces dot overlap corrected color dithering screens based on correcting the overlap of dots in the uncorrected dithering screens. The corrected color dithering screens are then applied to the multi-level color image signals at the color halftone dithering computing unit. The processing in the selector and correction unit is further described in connection with FIG. 14.

Figure 14:
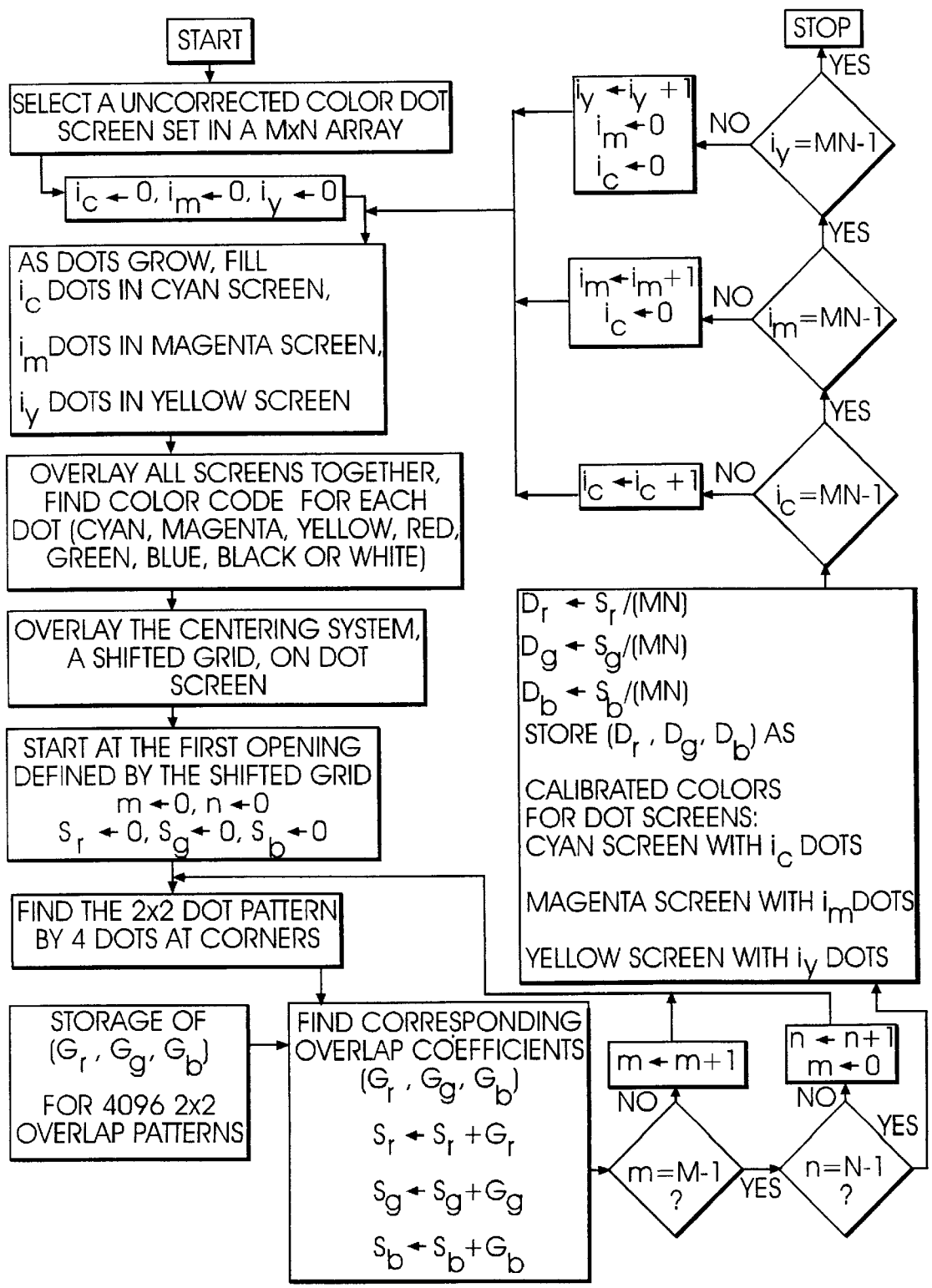
FIG. 14 is a flow chart of the program for the part of the system shown in FIG. 13 which generates dot overlap corrected color ordered dithering screens.

Referring now to FIG. 14, the operations for generating each corrected color dithering screen is the same as described in connection with FIG. 10 for a gray-scale dithering screen (first embodiment). In other words, generation of a corrected dithering screen in the case of black-and-white is applicable to the binary mode of color dots in any color channel. FIG. 14 illustrates the system using a CMY digital color printer. Thus, the set of uncorrected color dithering screens includes a cyan, magenta, and yellow dithering screens. These cyan, magenta, and yellow screens have openings with threshold values for comparing with multi-level digital signals in the red, green, and blue color channel, respectively. For each color dithering screen, the reflectance levels are recalculated in the same manner as gray levels are calculated in the first embodiment. The reflectance levels for each color dithering screen are then used to recalculate the corresponding corrected threshold levels in the corrected dithering screen. FIG. 14 shows the recalculation of the reflectance levels for each color dithering screen occurring in parallel, and does not show the recalculation of threshold levels for each screen.

Referring back to FIG. 13, the corrected ordered dithering screen for each color channel is applied to halftone the pixels of $D_r(i, j)$, $D_g(i, j)$, $D_b(i, j)$ to provide $B_r(i, j)$, $B_g(i, j)$, $B_b(i, j)$. To color halftone, each color dithering screen is applied to the multi-level digital signals for the corresponding color, e.g., the red dithering screen is applied to $D_r(i, j)$. The openings in each screen correspond to corrected threshold levels, which are compared to the pixels for the corresponding color channel. The details of this operation is the same as described for applying the corrected dithering screen in the first embodiment to a continuous-tone gray-scale image, except that the gray-scale levels are substituted with color reflectance levels.

The above generation of corrected halftone color image in the second embodiment is applicable to both digital printers and digital color presses, such as used for producing color printing plates for color offset printing.

In the first and second embodiments, a scanner and digital printer are both coupled to a computer to provide the halftone correction systems. In an computer network situation, multiple computers use common digital printer(s). Thus, each computer needs to produce corrected halftone image signals to the digital printer in response to calibration information pertaining to each common digital printer. Further, such calibration information needs to be updated to each of the computers on the network whenever a printer is recalibrated.

Figure 15:
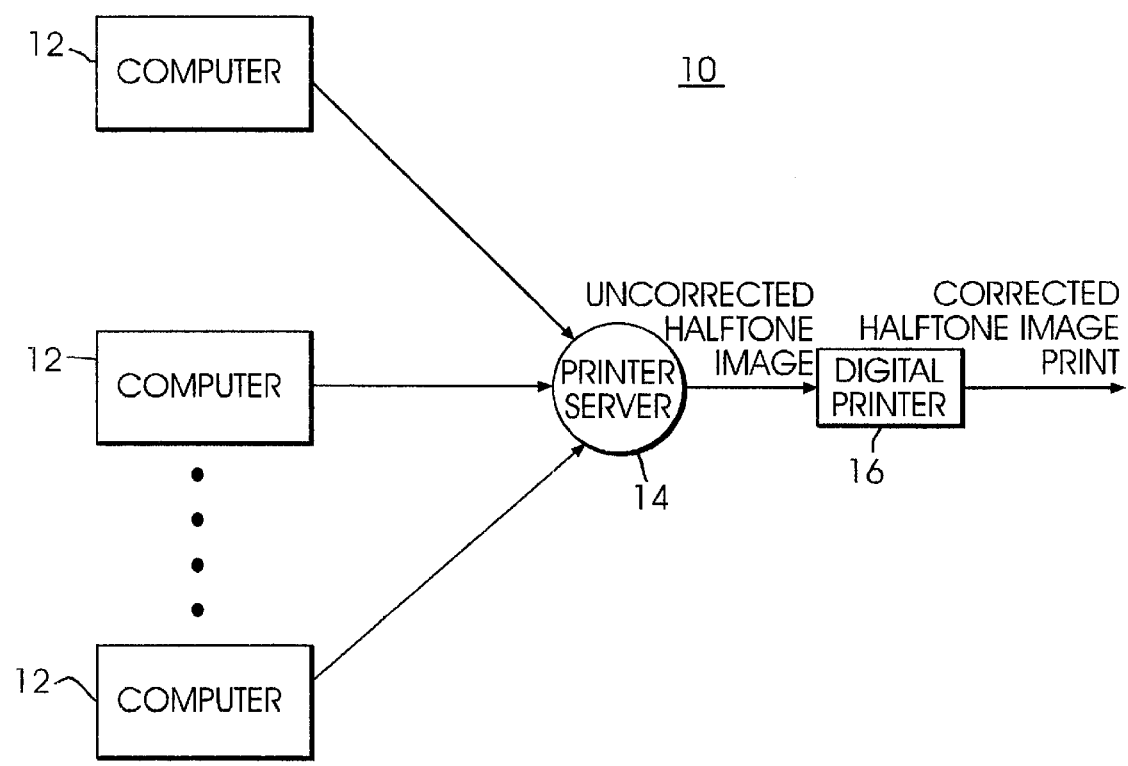
FIG. 15 is a system block diagram in accordance with the third embodiment of the present invention.

Referring now to FIG. 15, the third embodiment of the present invention is shown which simplifies the above described situation. FIG. 15 shows a block diagram of a system 10, such as a LAN computer network, having one or more computers 12, which are coupled to a single printer server 14. (Coupled preferably by being connected to each other). The system also includes a digital printer 16 coupled to printer server 14. (The network has been simplified for purposes of illustration.) In operation, printer server 14 receives binary image signals representing an image from any of computers 12. These binary image signals may contain a whole or partial uncorrected halftone image. The binary image signals, particularly the uncorrected halftone image component, are sent to digital printer 16. After receiving the binary signals representing the uncorrected halftone image, the digital printer 16 processes the signals to provide a print with a dot overlap corrected halftone image. The processing performed in digital printer 16 is shown in detail in FIG. 16. Note that digital printer 16 may be either black-and-white or color type depending on whether the binary image signals received by printer server 14 and sent to printer 16 are black-and-white or color respectively.

Figure 16:
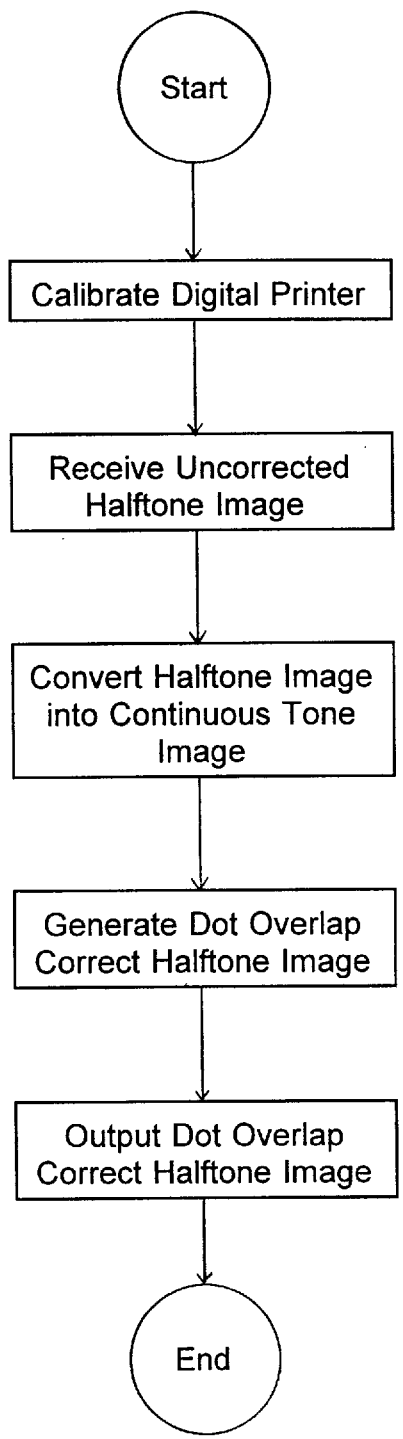
FIG. 16 is a flow chart of the program in the digital printer of FIG. 15.

Referring to FIG. 16, the printer in the system is initially calibrated to obtain halftone correction information using test patterns (as described in the first or second embodiments, or in the earlier cited co-pending application). After the calibration information is stored in the digital printer 16, printer 16 receives an uncorrected halftone image from printer server 14. The two-dimensional binary image signals representing the uncorrected halftone image are stored in printer 16, and represent a two-dimensional array of dots.

Next, printer 16 converts the binary signals of the uncorrected halftone image into a two-dimensional multi-level digital image signals corresponding to an array of pixels. In the case of a black-and-white digital printer, the binary image signals received by the printer represent black-and-white dots B(i,j), where B(i,j)=0 corresponds to a black dot, and B(i,j)=1 corresponds to a white dot. The continuous-tone gray-scale image D(i,j) to be generated will have, for example, an 8 bit gray-scale levels for each pixel, where 255 represents white and 0 represents black. The conversion takes place by assigning a 255 level to pixels in D(i,j) which positionally correspond to white dots, and assigning 0 to pixels in D(i,j) which positionally correspond to black dots. Thus, dots are assigned to multi-level signals based upon their color.

In a color printer the conversion operation described above occurs in each color channel, where $B_r(i,j)$, $B_g(i,j)$, $B_b(i,j)$ is converted into $D_r(i,j)$, $D_g(i,j)$, $D_b(i,j)$. The dots in the uncorrected (color) halftone image are assigned to multi-level digital image signals based on the binary signals in each color channel. For example, where the uncorrected halftone image has a dot represented by $B_r$, $B_g$, $B_b$=1, 0, 0 (i.e. the red channel is off, and the blue and green channels are on), then 8 bit multi-level image signals $D_r$, $D_g$, $D_b$=255, 0, 0 are assigned for a pixel corresponding to the dot.

After the image conversion, the printer generates a dot overlap corrected halftone image. Preferably for black-and-white digital printers, the multi-level gray-scale image is halftoned into a dot overlap corrected color halftone image by applying the error diffusion techniques described in the cited co-pending application. Also, preferably for color digital printers, the multi-level color image is halftoned using error diffusion techniques described earlier in the second embodiment. However, other halftoning techniques, such as least-squares method, may also be used to produce a dot overlap corrected halftone image. Finally, the dot overlap corrected halftone image is printed by the digital printer. This printed dot overlap corrected halftone image may be part of an image having binary signals representing non-halftone components, such as text or graphics.

The above described third embodiment has the advantage of allowing computers in a network to generate uncorrected halftone image by any desired means because the computers and digital printers operate independently to provide a dot overlap corrected halftone image print.

The systems described in the foregoing embodiments, and the earlier cited co-pending application, also provide corrected halftone images for digital printers which underfill their printed dots. In such printers printed dots are smaller than the square openings of the grid if FIG. 2. Uncorrected halftone images are consequently distorted because adjacent dots are not sufficiently close to each other. The halftone correction systems generate dot overlap corrected halftone images at digital printers in both the overlapping and the underfill dot situations.

From the foregoing description, it will be apparent that there has been provided improved systems for producing dot overlap corrected halftone images. Variations and modifications in the herein described systems, in accordance with the invention, will undoubted suggest themselves to those skilled in the art. Accordingly, the foregoing description should be taken as illustrative and not in a limiting sense.

I claim:

1. A system for producing dot overlap corrected halftone images on a digital printer comprising:

means for calibrating said printer with a set of test patterns to provide halftone correction information;

means for receiving multi-level digital image signals representing a continuous-tone image;

means for storing said multi-level digital image signals; and means for halftoning said multi-level digital image signals of the continuous-tone image using a screen corrected according to said halftone correction information to provide an overlap corrected halftone image at said digital printer, wherein said test patterns are independent of the screen corrected.

2. The system according to claim 1 wherein said calibrating means further comprises:

means for providing a sequence of binary test pattern digital signals corresponding to test patterns to the input of the digital printer so that a printed output of the test patterns is produced as patches of arranged printed dots, the test patterns being sufficient in number to characterize the printer;

means for measuring an average value of an optical characteristic feature of the printed output of each one of the test pattern patches; and means for storing the average values of the optical characteristic features of the test patterns as normalized average values extending over a range of multi-level digital image signals, thereby obtaining said halftone correction information.

3. The system according to claim 1 wherein said receiving means further comprises:

means for scanning a two-dimensional continuous-tone image to produce the multi-level digital image signals representing said continuous-tone image.

4. The system according to claim 2 wherein said halftoning means further comprises:

means for selecting an uncorrected ordered dithering screen, said uncorrected ordered dithering screen comprises a two-dimensional grid with openings corresponding to said multi-level digital image signals and said openings having different threshold levels within the range of said multi-level digital image signals;

means for determining responsive to said stored normalized average values a corrected ordered dithering screen having openings with threshold levels based on upon the partial overlap of adjacent dots in the uncorrected ordered dithering screen;

means for generating two-dimensional binary image signals by halftoning computation of said multi-level continuous-tone image using the corrected ordered dithering screen, wherein said two-dimensional binary image signals control the "on" and "off" states of printed dots;

means for storing the two-dimensional binary image signals; and means for generating a dot overlap corrected halftone image at said digital prints responsive to said stored two-dimensional binary image signals.

5. The system according to claim 4 wherein said means for determining a corrected ordered dithering screen comprises means for calculating the threshold levels of the corrected ordered dithering screen, said calculating means comprises:

means for generating a plurality of virtual output images, each said virtual output image having at least one said uncorrected ordered dithering screen, wherein said virtual output images have progressively greater numbers of dots, corresponding to an ordered progression of the threshold levels in said uncorrected ordered dithering screen, at openings of said uncorrected ordered dithering screen;

means for positioning a two-dimensional virtual screen having orthogonally intersecting lines upon each said virtual output image wherein the intersections of the screen lines are centered on the dots of said virtual output image;

means for determining for each virtual output image a representative level based on the normalized average levels of the test patterns which correspond to successive two-dot by two-dot patterns of said virtual output image on said virtual screen; and means for calculating said threshold levels of said corrected ordered dithering screen responsive to the representative levels of the virtual output images.

6. The system according to claim 5 wherein said means for calculating said threshold levels responsive to the representative levels of the virtual output images further comprises means for calculating each said threshold by averaging the representative levels of two successive virtual output images.

7. A method for producing dot overlap corrected halftone images on a digital printer comprising the steps of:

calibrating said digital printer with a set of test patterns to provide halftone correction information;

receiving multi-level digital image signals representing a continuous-tone image;

storing said multi-level digital image signals; and halftoning said multi-level digital image signals of the continuous-tone image using a screen corrected according to said halftone correction information to provide an overlap corrected halftone image at said digital printer, wherein said test patterns are independent of the screen corrected.

8. The method according to claim 7 wherein said calibrating step further comprises the steps of:

providing a sequence of binary test pattern digital signals corresponding to test patterns to the input of the digital printer so that a printed output of the test patterns is produced as patches of arranged printed dots, the test patterns being sufficient in number to characterize the printer;

measuring an average value of an optical characteristic feature of the printed output of each one of the test pattern patches; and storing the average values of the optical characteristic features of the test patterns as normalized average values extending over a range of multi-level digital image signals, thereby obtaining said halftone correction information.

9. The method according to claim 8 wherein said halftoning step further comprises the steps of:

selecting an uncorrected ordered dithering screen, said ordered dithering screen comprises a two-dimensional grid with openings corresponding to said multi-level digital image signals, and said openings having different threshold levels within the range of said multi-level digital image signals determining responsive to said stored normalized average values a corrected ordered dithering screen having openings with threshold levels based on upon the partial overlap of adjacent dots in the uncorrected ordered dithering screen;

generating two-dimensional binary image signals by halftoning computation of said multi-level continuous-tone image using the corrected ordered dithering screen, wherein said two-dimensional binary image signals control the "on" and "off" states of printed dots;

storing the two-dimensional binary image signals; and generating a dot overlap corrected halftone image at said digital printer responsive to said stored two-dimensional binary image signals.

10. A system for producing dot overlap corrected color halftone images on a digital color image output device comprising:

means for calibrating said digital color image output device with a set of color test patterns representing color dots which can differ in color from each other to provide halftone correction information;

means for receiving multi-level digital color image signals representing a continuous-tone color image;

means for storing said multi-level digital color image signals; and means for halftoning said multi-level digital color image signals of the continuous-tone color image responsive to said halftone correction information to provide an overlap corrected color halftone image at said digital color image output device, wherein said color test patterns are provided independent of said halftoning means.

11. The system according to claim 10 wherein said calibrating means further comprises:

means for providing a sequence of color test pattern digital signals corresponding to color test patterns to the input of said digital color image output device so that a printed output of the color test patterns is produced as arranged printed color dots, the color test patterns being sufficient in number to characterize the image output device;

means for measuring the average optical color value of each printed output; and means for storing the average optical color value for each printed output as normalized average color levels extending over the range of multi-level digital color image signals, thereby obtaining said halftone correction information.

12. The system according to claim 11 wherein said receiving means further comprises:

means for scanning a two-dimensional continuous-tone color image to produce multi-level digital color image signals, wherein said multi-level digital color image signals represent color pixels.

13. The system according to claim 12 wherein said halftoning means further comprises:

means for generating a two-dimensional virtual image screen having orthogonally intersecting screen lines defining a multiplicity of rectangular-shaped openings, and positioning each opening over the color pixels;

means for initializing two-dimensional binary color image signals, wherein said two-dimensional binary color image signals correspond to virtual color dots which are located at the intersections of screen lines;

means for selecting from the binary color image signals two-dimensionally successive groupings of adjacent color dots defined by a two-dot by two-dot pattern on said virtual image screen;

means for determining the binary color image signals based on the partial overlap of adjacent color dots in each of the selected groupings using a color halftone computation which is responsive to the stored normalized average color levels of the color test pattern representative of the selected grouping of color dots;

means for storing said determined binary color image signals; and means for outputting said overlap corrected color halftone image by said image output device responsive to said stored binary color image signals.

14. The system according to claim 13 wherein said means for determining the binary color image signals comprises:

means for determining, for each selected grouping of adjacent color dots, the binary color image signals of a fourth color dot in said selected grouping by determining all possible patterns having the binary color image signals of said first, second, and third adjacent color dots, determining the error between the stored normalized average color levels corresponding to the color test patterns representative of the possible patterns and the stored multi-level digital color image signals representing the color pixel at the opening of said virtual image screen between said first, second, third, and fourth color dots, choosing the test pattern having the lowest said error, and diffusing said error corresponding to said chosen color test pattern to color pixels of said two-dimensional continuous-tone color image in proximity of said color pixel at the opening of said virtual image screen between said first, second, third, and fourth color dots, wherein said binary color image signals of the fourth color dot is responsive to said chosen color test pattern; and said storing means further comprises means for storing, for each said grouping of adjacent color dots, the determined binary color image signals of the fourth color dot.

15. The system according to claim 12 wherein said digital color image output device operates responsive to two-dimensional binary color image signals, and said halftoning means further comprises:

means for selecting a plurality of uncorrected ordered dithering screens, wherein each said uncorrected ordered dithering screen corresponds to a different characteristic color of the binary color image signals, wherein each said uncorrected ordered dithering screen comprises a two-dimensional grid with openings corresponding to the multi-level digital color image signals and each said opening has a different threshold level within the range of the multi-level digital color image signals;

means for determining, responsive to said stored normalized average color levels, a corrected ordered dithering screen for each uncorrected ordered dithering screen, said corrected order dithering screen having openings with threshold levels based upon the partial overlap of adjacent color dots in the corresponding uncorrected ordered dithering screen;

means for generating two-dimensional binary color image signals by halftoning computation of said two-dimensional continuous-tone color image using the corrected ordered dithering screens;

means for storing said binary color image signals; and means for outputting said overlap corrected color halftone image by said image output device responsive to said binary color image signals.

16. The system according to claim 15 wherein said means for determining a corrected ordered dithering screen comprises means for calculating the threshold levels of the corrected ordered dithering screen, said calculating means comprises:

means for generating a plurality of virtual output images, each said virtual output image having at least one said uncorrected ordered dithering screen of the same characteristic color of the binary color image signals, wherein said virtual output images have progressively greater numbers of color dots, corresponding to an ordered progression of the threshold levels in said uncorrected ordered dithering screen, at openings of said uncorrected ordered dithering screen;

means for positioning a two-dimensional virtual screen having orthogonally intersecting lines upon each said virtual output image wherein the intersection of the screen lines are centered on the color dots of said virtual output image;

means for determining for each virtual output image a representative level based on the normalized average color levels of the color test patterns which correspond to successive two-dot by two-dot patterns of adjacent color dots on said virtual output image on said virtual screen; and means for calculating said threshold levels of said corrected ordered dithering screen responsive to the representative levels of the virtual output images.

17. The system according to claim 16 wherein said means for calculating said threshold levels responsive to the representative levels of the virtual output images further comprises means for calculating each said threshold by averaging the representative levels of two successive virtual output images.

18. The system according to claim 10 wherein said digital color image output device is one of a digital color printer and digital color press.

19. The system according to claim 10 wherein said halftoning means further comprises means for halftoning said multi-level digital color image signals by one of error diffusion and ordered dithering according to said halftone correction information.

20. A method for producing dot overlap corrected color halftone images on a digital color image output device comprising the steps of:

calibrating said digital color image output device with a set of color test patterns representing color dots which can differ in color from each other to provide halftone correction information;

receiving multi-level digital color image signals representing a continuous-tone color image;

storing said multi-level digital color image signals; and halftoning said multi-level digital color image signals of the continuous-tone color image responsive to said halftone correction information to provide an overlap corrected color halftone image at said digital color image output device, wherein said color test patterns are provided independent of said halftoning step.

21. The method according to claim 20 wherein said calibrating step further comprises the steps of:

providing a sequence of color test pattern digital signals corresponding to color test patterns to the input of said digital color image output device so that a printed output of the color test patterns is produced as arranged printed color dots, the color test patterns being sufficient in number to characterize the image output device;

measuring the average optical color value of each printed output; and storing the average optical color value for each printed output as normalized average color levels extending over the range of multi-level digital color image signals, thereby obtaining said halftone correction information.

22. The method according to claim 21 wherein said multi-level digital color image signals represent color pixels, and said halftoning step further comprises the steps of:

generating a two-dimensional virtual image screen having orthogonally intersecting screen lines defining a multiplicity of rectangular-shaped openings, and positioning each opening over the color pixels;

initializing two-dimensional binary color image signals, wherein said two-dimensional binary color image signals correspond to virtual color dots which are located at the intersections of screen lines;

selecting from the binary color image signals two-dimensionally successive groupings of adjacent color dots defined by a two-dot by two-dot pattern on said virtual image screen;

determining the binary color image signals based on the partial overlap of adjacent color dots in each of the selected groupings using a color halftone computation which is responsive to the stored normalized average color levels of the color test pattern representative of the selected grouping of color dots;

storing said determined binary color image signals; and outputting said overlap corrected color halftone image by said image output device responsive to said stored binary color image signals.

23. The method according to claim 21 wherein said digital color image output device operates responsive to two-dimensional binary color image signals, and said halftoning step further comprises the steps of:

selecting a plurality of uncorrected ordered dithering screens, wherein each said uncorrected ordered dithering screen corresponds to a different characteristic color of the binary color image signals, wherein each said uncorrected ordered dithering screen comprises a two-dimensional grid with openings corresponding to the multi-level digital color image signals and each said opening has a different threshold level within the range of the multi-level digital color image signals;

determining, responsive to said stored normalized average color levels, a corrected ordered dithering screen for each uncorrected ordered dithering screen, said corrected order dithering screen having openings with threshold levels based upon the partial overlap of adjacent color dots in the corresponding uncorrected ordered dithering screen;

generating two-dimensional binary color image signals by halftoning computation of said two-dimensional continuous-tone image using the corrected ordered dithering screens;

storing said binary color image signals; and outputting said overlap corrected color halftone image by said image output device responsive to said binary color image signals.

24. The method according to claim 20 wherein said digital color image output device is one of a digital color printer and digital color press.

25. A system for dot halftone correction of halftone images at a digital printer which operates responsive to two-dimensional binary image signals, comprising:

means for calibrating said digital printer with a set of test patterns to provide halftone correction information for said digital printer;

means for receiving uncorrected two-dimensional binary image signals representing an uncorrected halftone image;

means for storing said uncorrected binary image signals;

means for generating multi-level digital image signals responsive to said uncorrected binary image signals of said uncorrected halftone image;

means for storing the multi-level digital image signals; and means for halftoning said multi-level digital image signals at said digital printer responsive to said halftone correction information to provide a corrected halftone image output.

26. The system according to claim 25 wherein said calibration means further comprises:

means for providing a sequence of binary test pattern digital signals corresponding to test patterns to the input of a digital printer so that a printed output of the test patterns is produced as patches of arranged printed dots, the test patterns being sufficient in number to characterize the printer;

means for measuring an average value of an optical characteristic feature of the printed output of each one of the test pattern patches; and means for storing the average values of the optical characteristic features of the test patterns as normalized average values extending over a range of signal levels identical to the range of signal levels provided by the multi-level digital image signals, thereby obtaining said halftone calibration information.

27. The system according to claim 25 wherein said uncorrected two-dimensional binary image signals correspond to a two-dimensional arrangement of dots which are either black-and-white or in color, and said generating means further comprises means for converting said uncorrected two-dimensional binary image signals of said uncorrected halftone image into multi-level digital image signals by assigning multi-level digital image signals to each dot of said uncorrected two-dimensional binary image signals based on the dot color.

28. A method for dot halftone correction of halftone images at a digital printer which operates responsive to two-dimensional binary image signals, comprising the steps of:

calibrating said digital printer with a set of test patterns to provide halftone correction information for said digital printer;

receiving uncorrected two-dimensional binary image signals representing in uncorrected halftone image;

storing said uncorrected binary image signals;

generating multi-level digital image signals responsive to said uncorrected binary image signals of said uncorrected halftone image;

storing the multi-level digital image signals; and halftoning said multi-level digital image signals at said digital printer responsive to said halftone correction information to provide a corrected halftone image output.

29. A system for dot overlap correction of color halftone images at a digital color printer which operates responsive to two-dimensional binary color image signals, comprising:

means for calibrating said color printer with a set of color test patterns to provide halftone correction information for said digital printer;

means for receiving uncorrected two-dimensional binary color image signals representing an uncorrected color halftone image;

means for storing said uncorrected binary color image signals;

means for generating multi-level digital color image signals responsive to said uncorrected binary color image signals of said uncorrected color halftone image;

means for storing the multi-level digital color image signals; and means for halftoning said multi-level digital color image signals at said digital printer responsive to said halftone correction information to provide an overlap correct color halftone image output.

30. A method for dot overlap correction of color halftone images at a digital color printer which operates responsive to two-dimensional binary color image signals, comprising the steps of:

calibrating said color printer with a set of color test patterns to provide halftone correction information for said digital printer;

receiving uncorrected two-dimensional binary color image signals representing an uncorrected color halftone image;

storing said uncorrected binary color halftone image signals;

generating multi-level digital color image signals responsive to said uncorrected binary color image signals of said uncorrected color halftone image;

storing the multi-level digital color image signals; and halftoning said multi-level digital color image signals at said digital printer responsive to said halftone correction information to provide an overlap correct color halftone image output.

31. The system according to claim 1 wherein the test patterns do not exceed seven in number.

32. The method according to claim 7 wherein said receiving step further comprises the step of:

scanning a two-dimensional continuous-tone image to produce the multi-level digital image signals representing said continuous-tone image.

33. The method according to claim 9 wherein said step of determining a corrected ordered dithering screen comprises the step of calculating the threshold levels of the corrected ordered dithering screen, and said calculating step further comprises the steps of:

generating a plurality of virtual output images, each said virtual output image having at least one said uncorrected ordered dithering screen, wherein said virtual output images have progressively greater numbers of dots, corresponding to an ordered progression of the threshold levels in said uncorrected ordered dithering screen, at openings of said uncorrected ordered dithering screen;

positioning a two-dimensional virtual screen having orthogonally intersecting lines upon each said virtual output image wherein the intersections of the screen lines are centered on the dots of the virtual output image;

determining for each virtual output image a representative level based on the normalized average levels of the test patterns which correspond to successive two-dot by two-dot patterns of said virtual output image on said virtual screen; and calculating said threshold levels of said corrected ordered dithering screen responsive to the representative levels of the virtual output images.

34. The method according to claim 33 wherein said step of calculating said threshold levels responsive to the representative levels of the virtual output images further comprises the step of calculating each said threshold by averaging the representative levels of two successive virtual output images.

35. The method according to claim 7 wherein the test patterns do not exceed seven in number.

36. The system according to claim 10 wherein the color test patterns do not exceed 1,072 in number, and said color dots can be one of eight different colors.

37. The method according to claim 20 wherein said receiving step further comprises the step of:
   scanning a two-dimensional continuous-tone color image to produce multi-level digital color image signals.

38. The method according to claim 22 wherein said step of determining the binary color image signals further comprises the step of:
   determining, for each selected grouping of adjacent color dots, the binary color image signals of a fourth color dot in said selected grouping by determining all possible patterns having the binary color image signals of said first, second, and third adjacent color dots, determining the error between the stored normalized average color levels corresponding to the color test patterns representative of the possible patterns and the stored multi-level digital color image signals representing the color pixel at the opening of said virtual image screen between said first, second, third, and fourth color dots, choosing the test pattern having the lowest said error, and diffusing said error corresponding to said chosen color test pattern to color pixels of said two-dimensional continuous-tone color image in proximity of said color pixel at the opening of said virtual image screen between said first, second, third, and fourth color dots, wherein said binary color image signals of the fourth color dot is responsive to said chosen color test pattern; and
   said storing step further comprising the step of storing, for each said grouping of adjacent color dots, the determined binary color image signals of the fourth color dot.

39. The method according to claim 23 wherein said step of determining a corrected ordered dithering screen further comprises the step of calculating the threshold levels of the corrected ordered dithering screen, and said calculating step further comprises the steps of:
   generating a plurality of virtual output images, each said virtual output image having at least one said uncorrected ordered dithering screen of the same characteristic color of the binary color image signals, wherein said virtual output images have progressively greater numbers of color dots, corresponding to an ordered progression of the threshold levels in said uncorrected ordered dithering screen, at openings of said uncorrected ordered dithering screen;
   positioning a two-dimensional virtual screen having orthogonally intersecting lines upon each said virtual output image wherein the intersection of the screen lines are centered on the color dots of said virtual output image;
   determining for each virtual output image a representative level based on the normalized average color levels of the color test patterns which correspond to successive two-dots by two-dots patterns of adjacent color dots on said virtual output image on said virtual screen; and
   calculating said threshold levels of said corrected ordered dithering screen responsive to the representative levels of the virtual output images.

40. The method according to claim 39 wherein said step of calculating said threshold levels responsive to the representative levels of the virtual output images further comprises the step of calculating each said threshold by averaging the representative levels of two successive virtual output images.

41. The method according to claim 20 wherein said halftoning step further comprises the step of halftoning said multi-level digital color image signals by one of error diffusion and ordered dithering according to said halftone correction information.

42. The method according to claim 20 wherein the color test patterns do not exceed 1,072 in number, and said color dots can be one of eight different colors.

43. The system according to claim 25 wherein said halftoning means further comprises means for halftoning said multi-level digital image signals using a screen corrected according to said halftone correction information to provide an overlap corrected halftone image at said digital printer.

44. The system according to claim 25 wherein the test patterns do not exceed seven in number.

45. The system according to claim 25 wherein said receiving means receives said uncorrected two-dimensional binary image signals from one of a plurality of computers coupled to said digital printer.

46. The method according to claim 28 wherein said calibrating step further comprises the steps of:
   providing a sequence of binary test pattern digital signals corresponding to test patterns to the input of a digital printer so that a printed output of the test patterns is produced as patches of arranged printed dots, the test patterns being sufficient in number to characterize the printer;
   measuring an average value of an optical characteristic feature of the printed output of each one of the test pattern patches; and
   storing the average values of the optical characteristic features of the test patterns as normalized average values extending over a range of signal levels identical to the range of signal levels provided by the multi-level digital image signals, thereby obtaining said halftone calibration information.

47. The method according to claim 28 wherein said uncorrected two-dimensional binary image signals correspond to a two-dimensional arrangement of dots which are either black-and-white or in color, and said generating steps further comprises the step of converting said uncorrected two-dimensional binary image signals of said uncorrected halftone image into multi-level digital image signals by assigning multi-level digital image signals to each dot of said uncorrected two-dimensional binary image signals based on the dot color.

48. The method according to claim 28 wherein said halftoning step further comprises the step of halftoning said multi-level digital image signals using a screen corrected according to said halftone correction information to provide an overlap corrected halftone image at said digital printer.

49. The method according to claim 28 wherein the test patterns do not exceed seven in number.

50. The method according to claim 28 wherein said receiving step further comprises the step of receiving said uncorrected two-dimensional binary image signals from one of a plurality of computers coupled to said digital printer.

51. The system according to claim 29 wherein said calibrating mean further comprises:
   means for providing a sequence of color test pattern digital signals corresponding to color test patterns to the input of said digital color printer so that a printed output of the color test patterns is produced as arranged printed color dots, the color test patterns being sufficient in number to characterize the digital color printer;

means for measuring the average optical color value of each printed output; and means for storing the average optical color value for each printed output as normalized average color levels extending over the range of multi-level digital color image signals, thereby obtaining said halftone correction information.

52. The system according to claim 29 wherein said halftoning means further comprises means for halftoning said multi-level digital color image signals by one of error diffusion and ordered dithering according to said halftone correction information.

53. The system according to claim 29 wherein the color test patterns do not exceed 1,072 in number, and said color dots can be one of eight different colors.

54. The method according to claim 30 wherein said calibrating step further comprises the steps of:

providing a sequence of color test pattern digital signals corresponding to color test patterns to the input of said digital color printer so that a printed output of the color test patterns is produced as arranged printed color dots, the color test patterns being sufficient in number to characterize the digital color printer;

measuring the average optical color value of each printed output; and storing the average optical color value for each printed output as normalized average color levels extending over the range of multi-level digital color image signals, thereby obtaining said halftone correction information.

55. The method according to claim 30 wherein said halftoning step further comprises the step of halftoning said multi-level digital color image signals by one of error diffusion and ordered dithering according to said halftone correction information.

56. The method according to claim 30 wherein the color test patterns do not exceed 1,072 in number, and said color dots can be one of eight different colors.

* * * * *